(12) United States Patent
Ramanathan et al.

(10) Patent No.: US 10,175,855 B2
(45) Date of Patent: Jan. 8, 2019

(54) INTERACTION IN ORBIT VISUALIZATION

(71) Applicant: Oracle International Corporation, Redwood Shores, CA (US)

(72) Inventors: Jairam Ramanathan, Waltham, MA (US); Prashant Singh, Lexington, MA (US); Yi Dai, Winchester, MA (US); Jindrich Dinga, Santa Clara, CA (US); David Kamholz, Lyons, CO (US)

(73) Assignee: Oracle International Corporation, Redwood Shores, CA (US)

( * ) Notice: Subject to any disclaimer, the term of this patent is extended or adjusted under 35 U.S.C. 154(b) by 177 days.

(21) Appl. No.: 14/684,171

(22) Filed: Apr. 10, 2015

(65) Prior Publication Data
US 2015/0378529 A1 Dec. 31, 2015

Related U.S. Application Data

(60) Provisional application No. 62/053,638, filed on Sep. 22, 2014, provisional application No. 62/017,214, filed on Jun. 25, 2014.

(51) Int. Cl.
*G06F 3/0482* (2013.01)
*G06F 3/0481* (2013.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC .............. G06F 3/0482; G06F 3/04842; G06F 3/04817; G06F 3/04883; H04L 67/10; G06T 11/206; G06T 13/80; G06T 2200/24
See application file for complete search history.

(56) References Cited

U.S. PATENT DOCUMENTS 8,954,887 B1 * 2/2015 Tseng ................. G06F 3/04812
715/808
9,258,195 B1 * 2/2016 Pendleton ............... H04L 41/12
(Continued)

OTHER PUBLICATIONS

Racoma; J. Angelo—"Workday for iPad Launches; Makes ERP More Intuitive With 'Swirls' Interface" obtained at http://www.cmswire.com/cms/information-management/workday-for-ipad-launches-makes-erp-more-intuitive-with-swirls-interface-012252.php#null; Aug. 5, 2011; 5 pages.
(Continued)

*Primary Examiner* — Justin R. Blaufeld
(74) *Attorney, Agent, or Firm* — Trellis IP Law Group, PC

(57) ABSTRACT

A system and method for facilitating interacting with data and/or functionality via a visualization. An example method includes determining number of hierarchical levels to display in an orbit visualization; displaying the number of hierarchical levels via one or more nodes and one or more orbit paths, wherein each child node of a parent node of the one or more nodes is confined to one or more orbit paths that at least partially circumscribe the parent node; providing a first user option to navigate downward or upward in the hierarchy, at least in part via user selection of a node of the orbit visualization; and selectively updating the orbit visualization in response to user selection of the first user option so that a resulting updated visualization illustrates a navigated-to location, wherein the updated visualization illustrates the number of hierarchical levels.

6 Claims, 12 Drawing Sheets

(51) Int. Cl.
  *G06F 3/0484* (2013.01)
  *G06F 3/0488* (2013.01)
  *G06T 11/20* (2006.01)
  *G06T 13/80* (2011.01)
  *H04L 29/08* (2006.01)

(52) U.S. Cl.
  CPC ........ *G06F 3/04883* (2013.01); *G06T 11/206* (2013.01); *G06T 13/80* (2013.01); *H04L 67/10* (2013.01); *G06T 2200/24* (2013.01)

(56) References Cited

U.S. PATENT DOCUMENTS

| | | | | |
|---|---|---|---|---|
| 2002/0113816 | A1* | 8/2002 | Mitchell | G06F 3/0481 715/734 |
| 2002/0147805 | A1* | 10/2002 | Leshem | G06F 11/32 709/223 |
| 2003/0050906 | A1* | 3/2003 | Clifton-Bligh | G06F 3/0481 |
| 2011/0289459 | A1* | 11/2011 | Athans | G06F 3/0481 715/854 |
| 2013/0223614 | A1* | 8/2013 | Tuchman | H04M 3/523 379/265.09 |
| 2013/0332378 | A1* | 12/2013 | Brown | G06Q 10/105 705/319 |
| 2014/0047361 | A1* | 2/2014 | Gaspar | G06F 3/048 715/762 |
| 2014/0053110 | A1* | 2/2014 | Brown | G06F 3/0481 715/853 |
| 2014/0281868 | A1* | 9/2014 | Vogel | G06F 3/04817 715/212 |
| 2015/0046882 | A1* | 2/2015 | Menyhart | G06F 3/0482 715/854 |
| 2015/0378529 | A1* | 12/2015 | Ramanathan | G06T 11/206 715/834 |

OTHER PUBLICATIONS ict.business.it—"Work via the mobile: it is now more solid with Oracle"; obtained at http://www.ictbusiness.it/cont/news/lavoro-via-mobile-ora-e-piu-solido-con-oracle/30917/1.html#.VS2DuPnF8qW; translated to English by Google translator; Jun. 3, 2013; 3 pages.

* cited by examiner

INTERACTION IN ORBIT VISUALIZATION

CROSS REFERENCES TO RELATED APPLICATIONS

This application claims priority from the following Provisional Patent Applications, each of which is hereby incorporated by reference as if set forth in full in this application for all purposes:

1. U.S. Provisional Patent Application Ser. No. 62/017,214, entitled METHODS FOR NAVIGATING HIERARCHICAL DATA ON MOBILE DEVICES, filed on Jun. 25, 2014; and
2. U.S. Provisional Patent Application Ser. No. 62/053,638, entitled PETAL ANIMATION FOR TRANSITIONS IN HIERARCHY VISUALIZATIONS, filed on Sep. 22, 2014.

This application is related to the following U.S. Patent Applications, each of which is hereby incorporated by reference as if set forth in full in this application for all purposes:

3. U.S. patent application Ser. No. 14/604,429, entitled VISUALIZATIONS FOR NAVIGATING HIERARCHICAL DATA ON MOBILE DEVICES, filed Jan. 23, 2015;
4. U.S. patent application Ser. No. 14/684,142 entitled ORBIT VISUALIZATION FOR DISPLAYING HIERARCHICAL DATA, filed on Apr. 10, 2015;
5. U.S. patent application Ser. No. 14/684,151, entitled ORBIT VISUALIZATION ANIMATION, filed on Apr. 10, 2015;
6. U.S. patent application Ser. No. 14/684,159, entitled REFERENCE POSITION IN VIEWER FOR HIGHER HIERARCHICAL LEVEL, filed on Apr. 10, 2015;
7. U.S. patent application Ser. No. 14/644,544, entitled CHAIN LAYOUT FOR DISPLAYING HIERARCHICAL DATA, filed on Mar. 11, 2015;
8. U.S. patent application Ser. No. 14/644,555, entitled INTERACTION ORBIT VISUALIZATION, filed on Mar. 11, 2015, each of which are hereby incorporated by reference, as if set forth in full in this specification.
9. U.S. patent application Ser. No. 13/048,781, entitled VISUALIZATION AND INTERACTION WITH FINANCIAL DATA USING SUNBURST VISUALIZATION, filed on Mar. 15, 2011;
10. U.S. patent application Ser. No. 13/761,614, entitled VISUAL DATA ANALYSIS FOR LARGE DATASETS, filed on Feb. 7, 2013;

BACKGROUND

The present application relates to software and more specifically to user interface designs and methods for graphically displaying and interacting with data or associated computing objects.

Software and accompanying methods for facilitating information visualization are employed in various demanding applications, including enterprise resource planning, scientific research, digital libraries, data mining, financial data analysis, market studies, manufacturing production control, drug discovery, and so on. Such applications often demand space-efficient illustrative visualizations for clearly illustrating data and accompanying characteristics, patterns, and interrelationships, while preserving context as the user navigates and views the visualizations.

Illustrative visualizations with features for efficiently interacting with a visualization and data and associated relationships illustrated thereby can be particularly important for mobile enterprise applications, where large datasets and complex interrelated business objects are common.

Conventional visualizations, such as tree structures, often lack accompanying features enabling efficient and powerful interaction with underlying data and associated computing objects or data objects. Interaction is often limited to navigating and viewing data and relationships or representations thereof.

SUMMARY

An example method for facilitating interacting with data and/or functionality via a visualization includes determining number of hierarchical levels to display via the visualization, wherein the visualization includes an orbit visualization; displaying the number of hierarchical levels via one or more nodes and one or more orbit paths, wherein each child node of a parent node of the one or more nodes is confined to one or more orbit paths that at least partially circumscribes the parent node; providing a first user option to navigate downward or upward in the hierarchy, at least in part via user selection of a node of the orbit visualization; and selectively updating the displayed visualization in response to user selection of the first user option so that a resulting updated visualization illustrates a navigated-to location, wherein the updated visualization illustrates the number of hierarchical levels.

In a more specific embodiment, the example method further includes providing a second user option to navigate downward in a hierarchy represented by the orbit visualization by applying a two-finger separation gesture to a child node of a parent node of the visualization.

The specific example method may further include animating a transition of the orbit visualization from illustrating a first navigation location to illustrating the navigated-to location. An indicator (e.g., carousel control) may be displayed, which indicates a hierarchical level associated with the navigated-to location.

The first user option may further provide a user option to access underlying data associated with a selected node, wherein the selected node is selected at least in part via user selection of the first user option. The underlying data may include data of a computing object.

Another user option enables a user to trigger orbiting or movement of nodes about a first orbit path that at least partially circumscribes central node what includes one or more orbiting child nodes. Another user option may enable a user to trigger orbiting or movement of one or more displayed parent nodes about a second orbit path that at least partially circumscribes a grandparent node of the one or more orbiting child nodes.

Hence, certain embodiments discussed herein provide various efficient mechanisms for interacting with (e.g., navigating, triggering various software actions (e.g., drill-down actions), and so on) orbit visualizations.

A further understanding of the nature and the advantages of particular embodiments disclosed herein may be realized by reference of the remaining portions of the specification and the attached drawings.

DETAILED DESCRIPTION OF EMBODIMENTS

Figure 1:
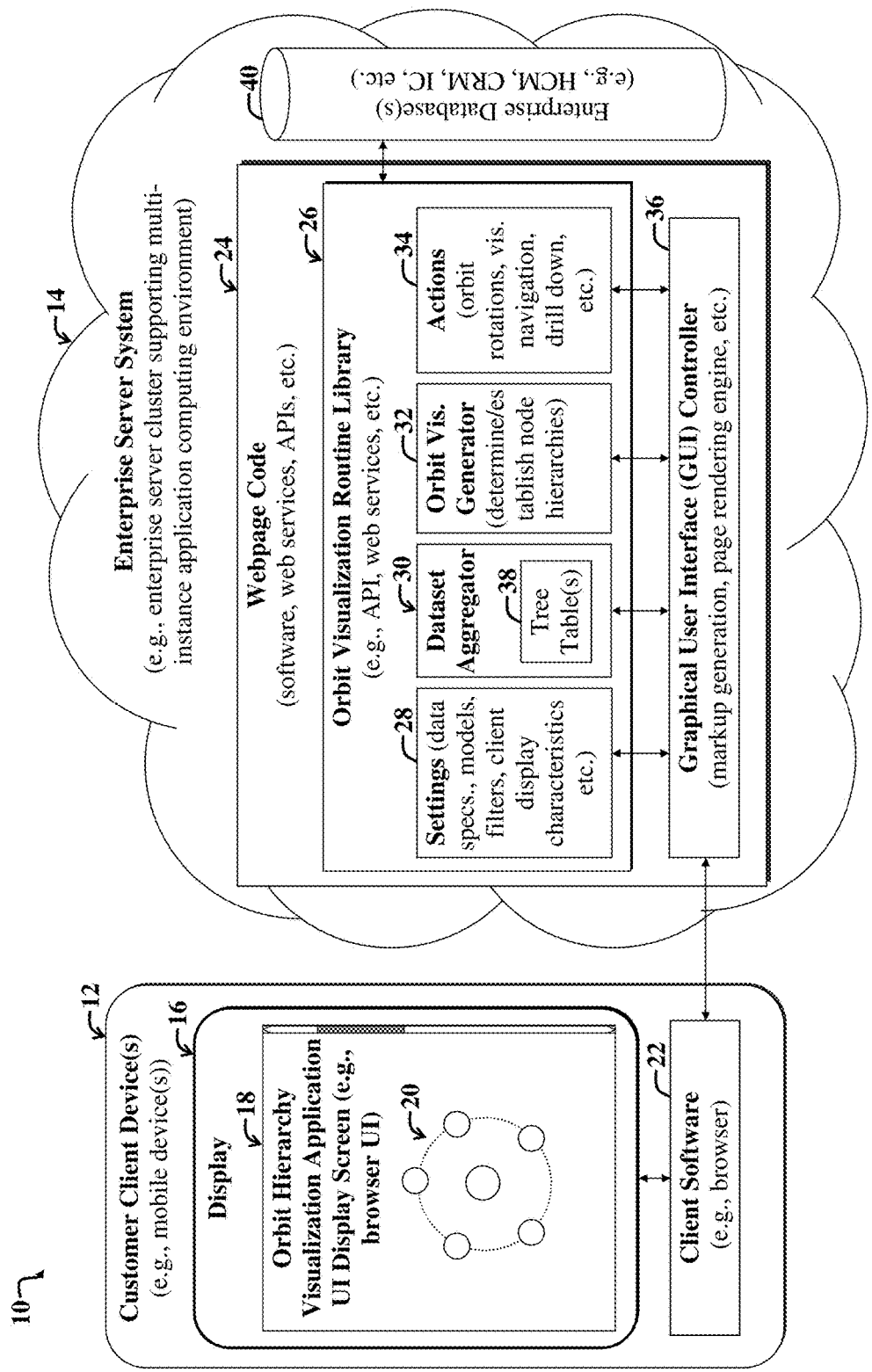
FIG. 1 is a diagram illustrating an example enterprise computing environment and accompanying system for facilitating generating and displaying hierarchical data via orbit visualizations.

For the purposes of the present discussion, information visualization may be any process involving graphically representing data according to a method or scheme. A graphical representation of data resulting from an information visualization technique is called a visualization. Example visualizations include pie charts, treemaps, bar charts, line graphs, N-boxes, maps with data layers, and so on.

An object, such as a data object, may be any grouping of or encapsulation of data and/or functionality. Examples of objects include classes or structures implemented via object-oriented programming languages; tables, rows, columns, fields, or records, of a database; and so on. An object may include a single item or instance of data, such as a number or other descriptor or attribute, or the object may include plural instances of data and/or functionality (e.g., software methods, such as functions or function calls) and may further include sub-objects.

A representation of an object, i.e., a displayed object, may be displayed via a graphical depiction, such as a node of a visualization, a menu item, dialog box, personnel icon, and so on. The graphical depiction of an object may also be called an object, a displayed object, or a node.

The terms "object," "data object," and "computing object" are employed interchangeably herein and may include functionality and/or data. Examples of computing objects include a note, appointment, a particular interaction, a task description, and so on. Examples of data that may be included in an object include text of a note (e.g., a description); subject, participants, time, and date, and so on, of an appointment; type, description, customer name, and so on, of an interaction; subject, due date, opportunity name associated with a task, and so on. An example of functionality that may be associated with or included in an object include issuing a reminder for an appointment, submitting an expense report for approval, approving of an expense report, and so on.

Generally, a node may be any graphical representation of an object in a visualization. Note that certain nodes may include sub-nodes, just as an object may include or represent additional objects, i.e., sub-objects.

For the purposes of the present discussion, a data attribute (also simply called attribute herein) may be any value or property characterizing data. Accordingly, an attribute of a visualization, node, or associated data, may refer to any characteristic of data used to generate a visualization or any characteristic of a visualization representing a characteristic of the data. The data characteristic and/or visualization characteristic may be employed to group or otherwise organize or visually distinguish the data by adjusting features or characteristics of the visualization. Examples of attributes include data dimensions or layers, such as specified by row or column headers of tables used to store the data used for a visualization.

Hence, a node attribute may be any characteristic of a node or any information associated with the node. A node attribute may include a characteristic of underlying data and/or may include a visual attribute.

A visual attribute may be associated with or mapped to an underlying node attribute. For example, a node representing a female employee may include a particular shape (visual attribute) that is associated with the underlying data (e.g., data attribute) indicating that node represents a female.

For the purposes of the present discussion, an enterprise may be any organization of persons, such as a business, university, government, military, and so on. The terms "organization" and "enterprise" are employed interchangeably herein. Personnel of an organization, i.e., enterprise personnel, may include any persons associated with the organization, such as employees, contractors, board members, customer contacts, and so on.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Examples of ERP software applications include Financials, Assets, Procurement, Projects, Supply Chain, and so on. The terms "ERP software" and "ERP application" may be employed interchangeably herein.

Enterprise software applications, such as Customer Relationship Management (CRM), Business Intelligence (BI), and project management software, often include databases with various database objects, also called data objects or entities. For the purposes of the present discussion, a database object may be any computing object maintained by a database. A computing object may be any collection of data and/or functionality. Examples of computing objects include an employee record, a product record, and so on. Examples of data that may be included in an object include employee name and address information, job role, performance ratings, project or task information, appointment records, and so on. An example of functionality that may be associated with or included in an object includes software functions or processes for issuing a reminder for an appointment.

In various embodiments discussed herein, to facilitate conveying information, visual properties of a node can be varied in accordance with a data attribute (also simply called attribute herein) characterizing the underlying object, i.e., data, thereby visually encoding the attribute.

Enterprise data may be any information pertaining to an organization or business, including information about customers, appointments, meetings, opportunities, customer interactions, projects, tasks, resources, orders, enterprise personnel, and so on. Examples of enterprise data include work-related notes, appointment data, customer contact information, descriptions of work orders, asset descriptions, photographs, contact information, calendar information, enterprise hierarchy information (e.g., corporate organizational chart information), and so on.

For the purposes of the present discussion, multi-dimensional data may be any data that can be partitioned by interrelated groupings or categories. A data dimension, often simply called "dimension," may be any category, such as an amount category, used to group or categorize data.

A data level may be any categorization of data of a given dimension. For example, data that includes a location dimension may include different data levels associated with state, county, city, and so on. Such data levels may represent an extrinsic sub-hierarchy of an implicit hierarchy that includes the location dimension. In general, extrinsic hierarchies include various data levels, while intrinsic hierarchies may include several dimensions that may include different data levels.

Enterprise data is often characterized by a hierarchy. For the purposes of the present discussion, a hierarchy may be any arrangement of items, e.g., data objects, names, values, categories, and so on. The items may be ordered or positioned such that they exhibit superior or subordinate relationships with related items in a data set. A hierarchy may refer to a displayed representation of data items or may refer to data and accompanying relationships existing irrespective of the representation.

Data hierarchies may be categorized as explicit and/or implicit hierarchies. Explicit hierarchical representations of data are organized according to hierarchical relationships inherent within the data. Such hierarchical relationships are often based on persistent data attributes characterizing the data. An example of an explicit hierarchy includes information about cities arranged by country, state, county, and so on. Another example may be a human resources hierarchy, which depicts a corporate structure, where employees are subordinate to project managers, which are subordinate to regional directors, and so on. In general, explicit hierarchies are defined and maintained irrespective of the visualization technique used to display the data.

For the purposes of the present discussion, an implicit hierarchical representation, i.e., implicit hierarchy, may refer to an organization of data and relationships that is user instantiated by choices made to display and/or analyze the data. Hence, certain implicit hierarchies may be implied from the way that users classify and summarize detailed amounts or metrics by different data dimensions on reports and analytics. Each level of an implicit hierarchy may correspond to a data dimension displayed in a report or analytic. A data dimension may be any category or classification of an amount or category. For example, columns of a table may represent data dimensions.

In certain embodiments discussed herein, trees (also called tree structures herein) that define a hierarchical structure characterizing data can be created by a human user such as an administrator. Underlying trees may be employed by software to construct orbit visualizations, as discussed more fully below.

Different utilities may be provided, such as TreeManager® in the PeopleSoft® suite of software products, which can allow a user to define trees or other hierarchies. Once defined, the tree can be applied to data to allow viewing of the data in accordance with the tree hierarchy. For example, spending accounts for each department in a large company can be organized via an orbit visualization according to the tree structure of the departments within the organization.

In general, hierarchical relationships characterizing hierarchical data may be "immediate", i.e. where the hierarchical levels of two data objects differ by one (1). In such a case, the data object with the higher hierarchical level may be called the "parent" or "immediate ancestor" or "inferior object" and the data object with the lower hierarchical level may be called the "child," or "immediate descendant," the "inferior object," "subordinate object." Depending upon the context, in an orbit visualization, a node representing a child object of a parent object is called a planet of a node representing the parent object.

Hierarchical relations may be "remote", i.e. where the hierarchical levels of two data objects differ by two (2) or more. In such a case, the data object (or corresponding node) with the higher hierarchical level may be called the "remote ancestor" (such as a "grandparent") and the data object (or associated node) characterized by the lower hierarchical level may be called the "remote descendant" (such as a "grandchild"). Data objects or nodes on the same hierarchical level may be called "hierarchical peers" or "siblings."

For clarity, certain well-known components, such as hard drives, processors, operating systems, power supplies, Internet Service Providers (ISPs), class loaders, bytecode compliers, middleware, and so on, are not necessarily explicitly called out in the figures. However, those skilled in the art with access to the present teachings will know which components to implement and how to implement them to meet the needs of a given implementation.

FIG. 1 is a diagram illustrating an example enterprise computing environment and accompanying system 10 for facilitating generating and displaying hierarchical data via one or more orbit visualizations 20.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices, without departing from the scope of the present teachings. For example, a system for generating orbit visualizations given a data set may be implemented entirely client-side, e.g., on a mobile device 12, without departing from the scope of the present teachings.

The example system 10 includes the mobile device 12, also called the client device (or simply client) herein, in communication with an enterprise server system 14, which comprises or more servers in communication with the mobile device 12 via a network, such as the Internet.

For the purposes of the present discussion, mobile computing device may be any computer that is adapted for portable use. In general, a computing device may be any computer. A computer may be any processor coupled to memory. Examples of mobile computing devices include laptops, notebook computers, smartphones and tablets (e.g., iPhone, iPad, Galaxy Tab, Windows Mobile smartphones, Windows 7 smartphones and tablets, Android smartphones tablets, Blackberry smartphones, and so on), and so on. Various specific example embodiments discussed herein may employ a mobile computing device further equipped with various features, such as a camera, a network connection, Global Positioning System (GPS) receiver, gyroscope, compass, and user input functionality, such as a touch screen and/or or qwerty keypad. The terms "mobile device" and "mobile computing device" are employed interchangeably herein.

A server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A server system may be any collection of one or more servers and accompanying computing resources.

The example mobile device 12 includes a touch screen 16 displaying a browser User Interface (UI) display screen, which includes an orbit hierarchy visualization UI display screen 18, which illustrates an example orbit visualization 20.

For the purposes of the present discussion, a UI display screen may be any software-generated depiction presented on a display. Examples of depictions include windows, dialog boxes, displayed tables, and any other graphical UI features, such as UI controls, presented to a user via software, such as a browser. A UI display screen contained within a single border is called a view or window. Views or windows may include sections, such as sub-views or sub-windows, dialog boxes, graphs, tables, and so on. In certain cases, a UI display screen may refer to all application windows presently displayed on a display.

An orbit visualization may be any visualization or graphical representation of data and/or concepts that represents hierarchical relationships between nodes, at least in part by distributing or positioning one or more subordinate nodes (also called child nodes) about a superior node, where the superior node is a parent node of the one or more subordinate nodes, and where the positions of the one or more subordinate nodes are confined to a path or boundary that at least partially circumscribes the parent node. The terms "orbit hierarchy visualization," "orbit hierarchy," and "orbit visualization" are employed interchangeably herein.

Client-side software 22 may include a browser and associated Graphical User Interface (GUI) software adapted to facilitate browsing content provided by the enterprise server system 14, including applications implemented via webpage code 24. The client-side software 22 includes computer instructions for facilitating rendering hierarchical data, i.e., any data characterized by objects or other elements of data and/or functionality which exhibit one or more hierarchical relationships relative to other objects. The hierarchical data may be retrieved from a backend database 40 of the enterprise server system 14.

The example webpage code 24 includes an orbit visualization routine library 26, which may be implemented via one or more Application Programming Interfaces (APIs), web services, and/or other mechanisms. The routine library 26 includes various modules 28-34, which are adapted to facilitate implementing software functionality used to generate rendering instructions for the orbit visualization 20 and for facilitating providing UI controls and other mechanisms for enabling user interaction with the orbit visualization 20, e.g., enabling navigating a hierarchy of underlying data used to generate the orbit visualization; enabling drilling down into data of data object represented by a node of the orbit visualization 20, and so on, as discussed more fully below.

For the purposes of the present discussion, software functionality may be any function, capability, or feature, e.g., stored or arranged data, that is provided via computer code, i.e., software. Generally, software functionality may be accessible via use of a UI and accompanying UI controls and features. Software functionality may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

UI control may be any displayed element or component of a UI display screen, which is adapted to enable a user to provide input, view data, and/or otherwise interact with a UI. Additional examples of UI controls include buttons, drop down menus, menu items, tap-and-hold functionality, and so on. Similarly, a UI control signal may be any signal that is provided as input for software, wherein the input affects a UI display screen and/or accompanying software application associated with the software.

For the purposes of the present discussion, navigation may refer to a transition of a UI display screen from a first display of one or more objects to a second display of one or more objects in response to user selection of an object or control in the first display of one or more objects.

A user is said to navigate data or to navigate a menu if the user selects one or more different displayed objects or items (e.g., navigation link) to activate other objects or items to be displayed. A navigation link may be any UI control adapted to trigger navigation to a node represented by the navigation link. User selection of a navigation link results in display of a navigated-to location. The updating of a UI display screen and/or associated displayed visualization in response to user selection of a navigation link represents implementation of a navigation step.

A navigated-to node may be any node that is prominently displayed in a UI display screen, such that further navigation is not required to view a representation of the node. In certain embodiments discussed herein, navigated-to nodes are illustrated as central nodes of an orbit visualization.

When navigating a hierarchy visualization, a user is said to implement downward navigation if the user navigates to one or more lower levels of the hierarchy, e.g., by navigating to a child node of a parent node. Similarly, upward navigation involves navigation to one or more higher levels of a hierarchy, e.g., by navigating to a parent node of a child node. In various embodiments discussed herein, the navigated-to node becomes the centrally displayed node, i.e., the node that is most prominently featured, e.g., positioned closest to a center or centroid of the associated orbit visualization.

A representation of an object, i.e., a displayed object, may be displayed via graphical depiction, such as a menu item, dialog box, icon, and so on. The graphical depiction of an object may also be called an object, a displayed object, or a node. Data (or corresponding data object) is said to underlie a node of a visualization if the node is used to navigate the data or to otherwise access the data and/or associated functionality.

For the purposes of the present discussion, in an orbit visualization, a central node may be any node that is displayed closest to a center or centroid of a visualization. In general, the central node represents an example of a navigated-to node, which is part of a navigated-to location of a UI framework characterizing a UI of software used to display orbit visualizations.

Various modules 28-34 of the orbit visualization routine library 26 may communicate with the backend database 40 to facilitate selective retrieval of (and/or access to) data and associated data objects for use in generating rendering instructions for displaying orbit visualizations 20 and accompanying nodes, which represent underlying data objects.

The server-side webpage code 24 further includes a GUI controller 36, which is adapted to selectively communicate with one or more modules 28-34 of the orbit visualization routine library 26 and the client-side software 22. The GUI controller 36 may further act as an interfacing mechanism for enabling various modules 28-34 of the orbit visualization routine library 26 to intercommunicate.

Additional computer instructions, i.e., computer code, of the GUI controller 36 are adapted to selectively call functionality provided by one or more of the modules 28-34 as needed to enable data retrieval and implementation of updates to the orbit visualization 20 in response to user interaction therewith.

User interaction with the orbit visualization 20 may include, but is not limited to navigating upward and downward in the hierarchy represented by the orbit visualization 20, implementing drill-down software actions for user-selected nodes, rotating nodes about a path (i.e., orbit path) that circumscribes a parent node, triggering display of actions menus, informative hover layers, and so on, as discussed more fully below.

The example modules 28-34 of the orbit visualization routine library 26 include a settings module 28, a dataset aggregator 30, an orbit visualization generator 32, and an actions module 34.

The settings module 28 is adapted to provide software functionality for enabling users to specify various settings to characterize the orbit visualization 20. Example settings include specifications of the number of hierarchical levels to display at a given time via the orbit visualization 20 of the client-side orbit hierarchy UI display screen 18; which data sets to visualize via the orbit visualization 20, and so on.

In the present example embodiment, certain settings, e.g., settings specifying the number of hierarchical levels to display, may be determined automatically. Automatic determination of such settings may be implemented by computer code running on the settings module 28. The settings module 28 is adapted to communicate with the client device 12 and accompanying software 22 to determine display characteristics, e.g., display size and resolution, device type, processor and memory specifications, and so on.

In general, larger or higher resolution displays may support display of additional hierarchical levels in the orbit visualization 20 at a given time. The exact number of hierarchical levels to display is implementation specific and may vary, without departing from the scope of the present teachings. Furthermore, various settings may be manually and/or automatically, without departing from the scope of the present teachings.

In general, the settings module 28 may include display characteristics detection software code for facilitating detecting display size, resolution, available client-side native plugins, graphics processing resources, and so on. Additional functionality of the display characteristics detection software code may include functionality for detecting a characteristic of a data object represented via a node of the visualization, and then visually encoding the characteristic via the node. Additional functionality may include detecting one or more permissions associated with a user logged into software used to display the visualization, and adjusting one or more available user options based on the one or more permissions. Additional functionality may be implemented via mechanisms for adjusting visual encoding of information via one or more nodes of the visualization in accordance with the one or more permissions.

For the purposes of the present discussion, visual encoding (also simply called encoding or coding herein) of a data attribute may be any process involving representing the data attribute graphically. For example, if a hierarchical position of a node in an enterprise organizational chart is used to adjust a size, shape, color, or position, etc., of the node in a visualization, then the hierarchical position is said to be visually encoded via the node size, shape, color, or position, respectively.

An attribute of a visualization, node, or associated data, may be any characteristic of data used to generate a visualization, where the characteristic may be employed to group or otherwise organize or visually distinguish the data by adjusting features or characteristics of the visualization. Examples of attributes include data dimensions or layers, such as specified by table headers of tables 38 used to store the data used for a visualization.

The dataset aggregator 30 is adapted to selectively retrieve data (e.g., via Structured Query Language statements, web services, and/or other mechanisms) from the backend database 40, e.g., with reference to the settings 28 and any associated data models specified for use in displaying the orbit visualization 20. Retrieved data may be stored in a cache of the dataset aggregator 30, or alternatively, may be maintained at the database 40 and then only retrieved when needed to facilitate generation of the orbit visualization 20.

Hierarchical relationships inherent in data retrieved by the dataset aggregator 30 may be stored as tree tables 38 or pivot grids. Hierarchical relationships represented by the tree tables 38 may be user-specified and may be adjusted, or alternatively, the relationships are predetermined. Predetermined relationships may include, for example, hierarchical relationships characterizing enterprise personnel, as may be conventionally represented via a tree structure representing an organizational chart.

In the present example embodiment, the displayed orbit visualization 20 represents a hierarchy visualization, whose hierarchical relationships may conventionally characterized by a tree structure.

For the purposes of the present discussion, a hierarchy visualization may be any visualization that is adapted to illustrate a hierarchy or hierarchal relationship between data or data objects. As set forth above, a hierarchy may be any ordering of or arrangement of data, where different data in the arrangement may exhibit superior or subordinate relationships with other data.

A hierarchy may refer to a displayed representation of data objects or may refer to data and accompanying relationships existing irrespective of the representation. For example, an enterprise hierarchy, e.g., which may be displayed via an organizational chart (also called org chart) may be any power structure, position structure, or reporting structure characterizing an enterprise.

The orbit visualization generator module 32 includes computer code for generating rendering instructions for rendering the orbit hierarchy visualization application UI display screen 18, including the accompanying orbit visualization 20. The orbit visualization generator module 32 may reference information and/or instructions provided by other modules 28, 30, 34 of the orbit visualization routine library 26 to facilitate generation of the rendering instructions. The rendering instructions may then be processed by the GUI controller 36 and forwarded to the client software 22 for facilitating rendering and display of the orbit hierarchy visualization application UI display screen 18.

The actions module 34 is adapted to facilitate implementation of software actions associated with various UI controls of the displayed orbit hierarchy visualization application UI display screen 18. Note that in general, a visualization may be coupled to or may otherwise include one or more UI controls, which are associated with software functionality, whereby user selection of the UI control triggers execution of a software action.

For the purposes of the present discussion, a software action may be any process or collection of processes or operations implemented via software. Additional examples of processes include updating or editing data in a database, placing a product order, creating an opportunity business object, creating a business contact object, adding a revenue line to a business object, displaying data visualizations or analytics, triggering a sequence of processes, launching an enterprise software application, displaying a dialog box with details and functionality associated with a particular node (e.g., implementing a drill-down), spinning or moving planet nodes about an orbit path around a parent node, and so on.

In various example embodiments discussed herein, the client-side display 16 represents a touch screen. Various UI controls and associated mechanisms are responsive to touch gestures as input.

For the purposes of the present discussion, touch gesture may be any input provided to a touch-sensitive display, i.e., touch screen, by touching the display. A display may be touched with one or more fingers and/or other objects or devices, such as a stylus.

A multi-touch gesture, such as a two-finger swipe, two-finger separation gesture, two-finger pinch gesture, and so on, may be any gesture that involves contacting a touch-sensitive display simultaneously at different positions on the display.

A gesture may include motion across a display or a tap at a predetermined position or any position of the display. Certain touch gestures may include touching the display and moving fingers or other devices in certain patterns across the display or across certain portions of the display to trigger different UI input signals to control the UI display screens and accompanying applications.

Figure 2:
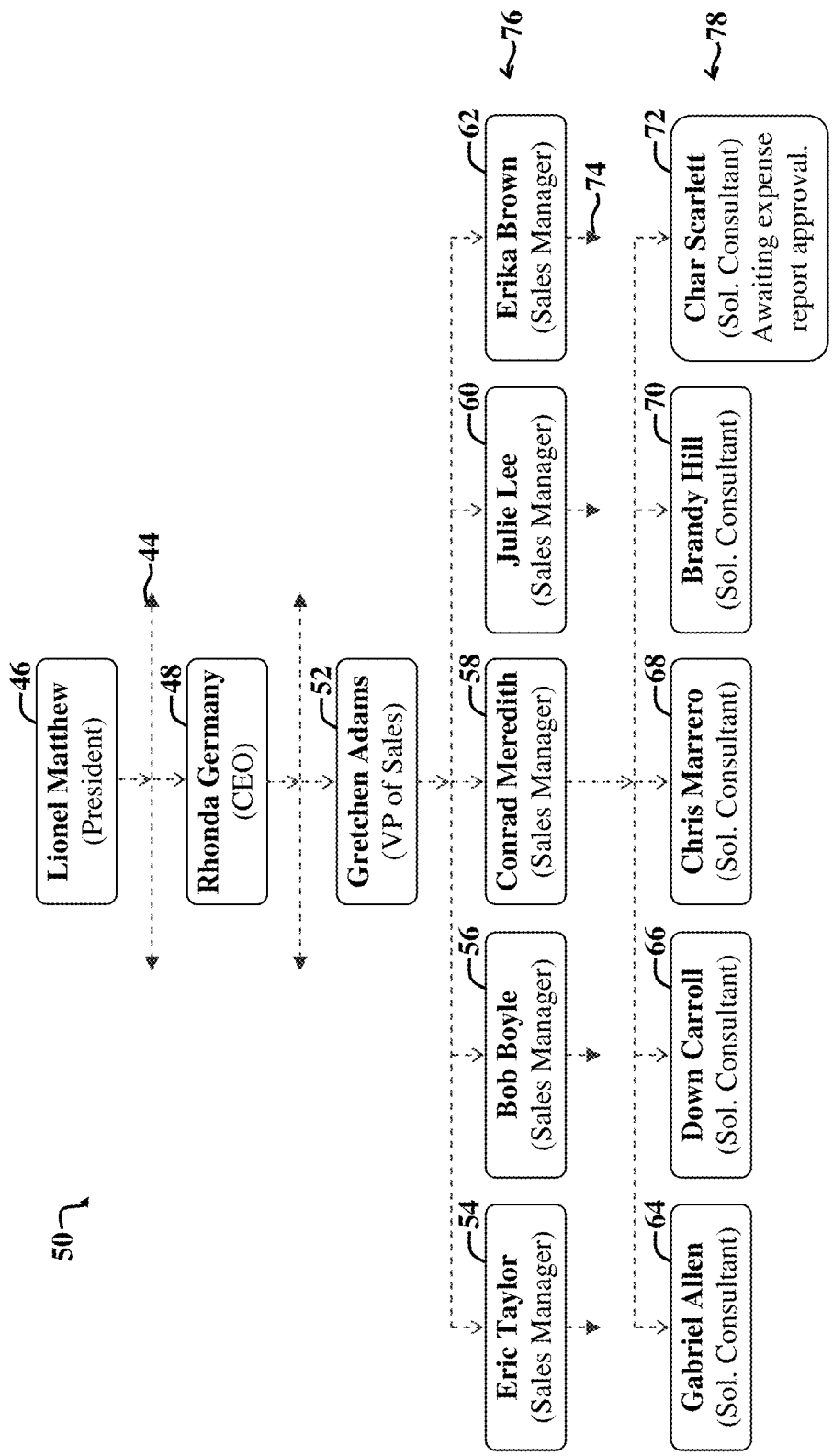
FIG. 2 shows an example tree diagram depicting hierarchical relationships between example data objects, the relationships of which are leveraged by the data aggregator of the system of FIG. 1 to generate orbit visualizations.

FIG. 2 shows an example tree diagram 50 depicting hierarchical relationships (also simply called the hierarchy) between example data objects 46-72. The hierarchical relationships are leveraged by the data aggregator 30 of the system 10 of FIG. 1 to generate orbit visualizations, e.g., the orbit visualization 20 of FIG. 1. The example tree diagram 50 may represent hierarchical relationships of the tree tables 38 of the data aggregator 30.

Note that conventionally, the hierarchical relationships illustrated by the tree diagram 50 may be displayed on a UI display screen as a tree diagram. However, tree diagrams may be relatively cumbersome to use and navigate, especially when used to represent large datasets on relatively small mobile device displays, as conventional panning, zooming, scrolling, and so on, may result in loss of context as the user interacts with the data represented via the tree diagram.

The following discussion of the tree diagram 50 is adapted to facilitate an understanding of various embodiments and associated orbit visualizations, discussed more fully below. The example tree diagram 50 illustrates, at a highest level of the associated hierarchy, a top object 46 (also called a top tier object or a first tier object). A second tier object 48 represents a child object of the top tier object 46. Similarly, a third tier object 52 represents a child object of the second tier object 48.

Example horizontal lines with arrows (e.g., the line with arrowheads 44) indicate that additional sibling objects of an object (e.g., a "Rhonda Germany" object 48) below the line 44 may exist. Similarly, vertical lines with arrowheads (e.g., the line 74) indicate that the associated object is further associated with additional child objects.

The third tier object 52 includes various child objects 54-62 at a fourth level (i.e., fourth tier 76) down in the hierarchy 50. An example fourth tier object 58 represents a parent object of its child objects 64-72, which represent fifth tier objects 78. The fifth tier objects 64-72 represent descendant objects of the top tier object 46.

When a user navigates the hierarchy 50 to view lower level objects, the user is said to be navigating downward in the hierarchy. Similarly, if a use navigates a UI display screen to view data of a first child object 54; then to view data of a second child object 56, etc., the user is said to be navigating horizontally in the hierarchy 50.

Figure 3:
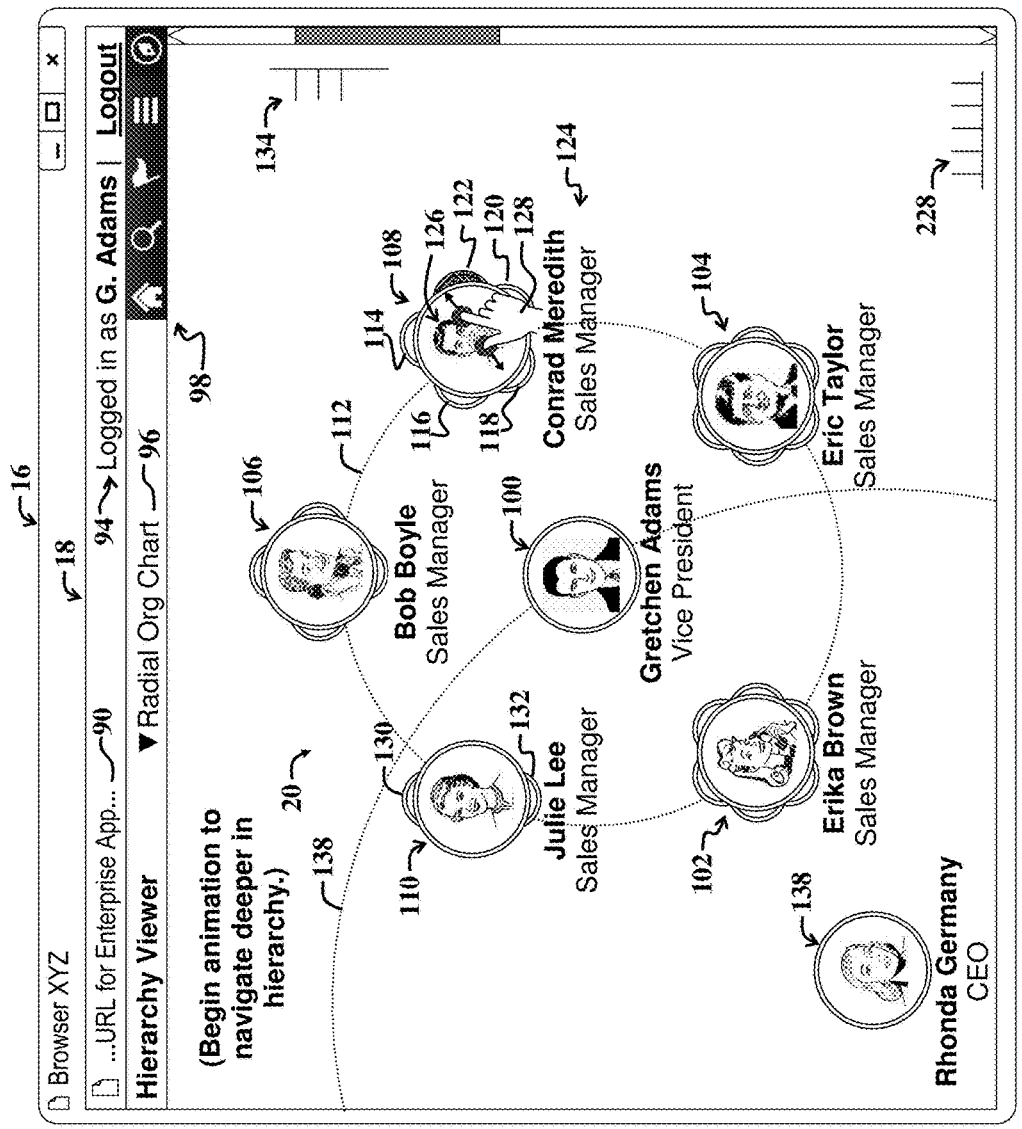
FIG. 3 shows a first example user interface display screen and accompanying orbit visualization reflecting example hierarchical relationships between visualization nodes, where the nodes represent underlying data objects.

FIG. 3 shows a first example UI display screen 18 (which may be implemented via the mobile device display 16 of FIG. 1 or other mechanism, e.g., desktop display) and accompanying orbit visualization 20. The orbit visualization 20 reflects example hierarchical relationships between visualization nodes 100-110, where the nodes 100-110 represent underlying data objects.

With reference to FIGS. 1 and 3, in the present example embodiment, a user has employed the mobile device 12 to browse to a web site indicated by an example Uniform Resource Locator (URL) or Uniform Resource Identifier (URI) 90 exhibiting the webpage code 24. The user then logs into the software 24 by providing credentials, e.g., username and password, which are associated with predetermined user access permissions of the user.

A user then interacts with the webpage code 24 to select an orbit visualization, e.g., orbit organizational chart selected from a drop-down menu 96. Additional UI controls 98 may facilitate user navigation of the overall orbit hierarchy visualization application UI display screen 18.

The webpage code 24 is activated to retrieve data objects and associated interrelationships as depicted in the tree diagram of FIG. 2, and further illustrated via the orbit visualization 20 of FIG. 3. In the present example embodiment, the user has logged in as "Gretchen Adams," as indicated by login indicia 94. A central node 100 representing a data object containing information associated with the Gretchen Adams enterprise employee is shown by default as the central node 100 of the orbit visualization 20.

Note that while in the present example embodiment, a node corresponding to the logged-in user is initially depicted as the central node, embodiments are not limited thereto. Initial displays of the orbit visualizations as discussed herein may vary, e.g., depending upon visualization settings, without departing from the scope of the present teachings.

With reference to FIGS. 2 and 3, the third tier node 52 of FIG. 2 is depicted as the central Gretchen Adams node 100 of the orbit visualization. Child nodes 102-110 of the parent Gretchen Adams node 100 correspond to the child objects 54-62 of the top tier node 52.

A "Conrad Meredith" node 108 is shown including various petals 114-122. The petals 114-122 correspond to or represent the fifth tier objects 64-72 of FIG. 2. Note that the fifth petal 122 is visually encoded to draw the attention of the logged in user. In the present example embodiment, the fifth petal 122 corresponds to the data object 72 of FIG. 2, and the visual encoding further indicates that an employee associated with the data object 72 is awaiting approval of an expense report (e.g., as shown in FIG. 2).

For the purposes of the present discussion, a petal may be any displayed node or portion thereof that represents a data object, wherein a portion of the node overlaps or is obscured (or appears to overlap or be obscured) by a portion of a parent node about which the petal is positioned.

Note that in certain implementations, petals of a given node may be selectively distributed in different ways as a way to visually encode information. For example, in implementations displaying large nodes with several petals, different petals may be clustered about an outer edge of the large node in accordance with a predetermined grouping criteria, e.g., as may be established by configuring settings. User options for adjusting settings may be accessible via one or more of additional UI controls 98.

In general, the various planets, i.e., child nodes 102-110 of the orbit visualization 20 are confined to an orbit path 112 that circumscribes, i.e., surrounds, the central parent node 100. User options for rotating, spinning, or otherwise repositioning the child nodes 102-110, may be provided, e.g., by enabling a swipe gesture to trigger movement or orbiting of the child nodes 102-110 about the central node 100.

The child nodes 102-110 are also called satellite nodes or planets, which when moved about the orbit path 112 are said to orbit the central node 100. The example nodes 100-110 may include various indicia, e.g., indicia 124, indicating a name and title of an enterprise employee associated with a given node, which is in turn associated with an underlying data object.

Each planet (also called planet node) 102-110 may include petals indicative of and/or corresponding to direct reports, i.e., child nodes of the planet. For example, a "Julie Lee" node 110 includes two direct reports associated with petals 130, 132.

For the purposes of the present discussion, a planet may be any node of an orbit visualization that is at least approximately confined to an orbit path or position on an orbit path or boundary. The terms "planet," "planet node," "satellite," "satellite node" are employed interchangeably herein. Petals may represent a particular type of planet, which may be actuated and separated from the boundary of a parent node, e.g., via a two-finger separation gesture 128.

The UI display screen 18 further includes a carousel control 134. The carousel control 134 is configured to indicate a level or navigation location currently being shown by the orbit visualization 20. For example, the carousel control 134 includes three horizontal bars indicating that the currently displayed navigation level corresponds to a third tier view, which illustrates the top tier Gretchen Adams node 100 as a central node. Alternatively, or in addition, the carousel control 134 features indicate a number of navigation steps that the logged in user has navigated to, where each navigation step may represent or correspond to a navigation breadcrumb, as discussed more fully below.

The carousel control 134 is adapted to provide additional navigation functionality and navigation reference features. For example, a tap and hold gesture applied to the carousel control 134 may activate a user selectable list indicating different navigation locations to which a user may transition the orbit visualization 20. Similarly, a horizontal carousel control 228 provides features for facilitating horizontal navigation to different siblings of the central node 100. The example horizontal carousel control 228 includes five vertical bars corresponding to five siblings of the central Gretchen Adams node 100. A tap and hold gesture applied to the horizontal slider may activate a menu or list with breadcrumbs or other links to facilitate horizontal navigation to sibling nodes of the Gretchen Adams node 100.

For the purposes of the present discussion a carousel control may be any mechanism, e.g., UI control and/or widget, that may be scrolled to view elements or links that may be navigated to. A breadcrumb may be any mechanism for marking a history of navigation steps during navigation of a graphical UI of a software application.

For the purposes of the present discussion, a linked breadcrumb may be any user selectable mechanism for indicating a previously visited menu item, UI display screen, or other navigation location, e.g., database object, folder, file, dialog box, and so on, and enabling triggering of subsequent navigation thereto. In the present specific embodiment, a particular displayed representation of a breadcrumb (also called a breadcrumb) may act as a hyperlink upon user selection thereof, where the hyperlink triggers display of a UI display screen representative of the name of the breadcrumb.

Hence, the term "breadcrumb" may include data characterizing a UI display screen associated with or indicated via the breadcrumb and/or the displayed representation of the UI control characterizing the breadcrumb, and/or functionality associated with the UI control.

In general, a breadcrumb trail represented in a list that is activatable via the carousel control 134 may indicate a current navigation location and provide mechanisms enabling users to transition to display of previously visited navigation locations, i.e., UI display screens. A carousel control list may be any UI feature that visually indicates one or more breadcrumbs and/or representations of one or more breadcrumbs.

Figure 4:
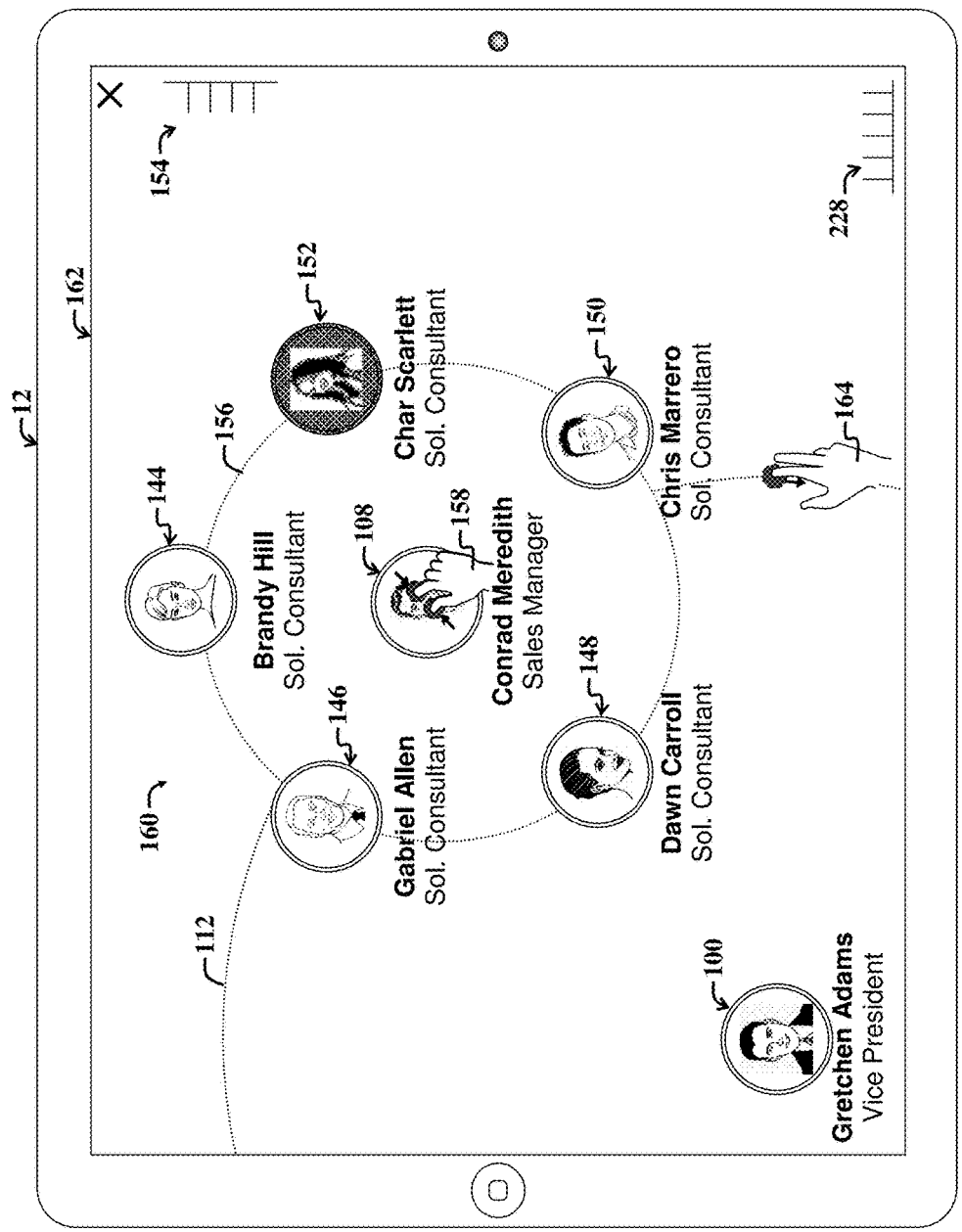
FIG. 4 shows a second example user interface display screen, illustrating a navigated-to location in the orbit visualization after initiation of a downward navigation via the first example user interface display screen of FIG. 3.

FIG. 4 shows a second example UI display screen 162, which may correspond to the first example UI display screen 18 of FIG. 3 after a navigation action involving spreading of a node (i.e., the Conrad Meredith node 108 of FIG. 3 via a two-finger separation gesture 128) to navigate deeper into the associated hierarchy represented by the orbit visualization 20 of FIG. 3.

With reference to FIGS. 3 and 4, a two-finger separation gesture 128 applied to the Conrad Meredith node 108 of FIG. 3 results in a downward navigation of the orbit visualization 20, resulting in display of an updated orbit visualization 160 of FIG. 4.

In the updated orbit visualization 160, the petals 114-122 of the Conrad Meredith node 108 are converted into respective orbiting planets 144-152, which orbit (i.e., are movably positioned about) the central Conrad Meredith node 108 in the updated orbit visualization 160.

The visually encoded petal 122 of FIG. 3 is represented by a visually encoded "Char Scarlett" node 152 in FIG. 4. Additional indicia may accompany the various planets 144-152 in accordance with an amount of display screen space available for the indicia.

The expanded petals, i.e., planets 144-152 of the Conrad Meredith node 108 are confined to a second orbit path 156 that circumscribes the Conrad Meredith node 108. The Gretchen Adams node 100, which represents a parent of the Conrad Meredith node 108, is shown in a corner of the second UI display screen 162.

The first orbit path 112 to which the Conrad Meredith node 108 is approximately confined is also shown. A portion of the first orbit path 112 is shown in the UI display screen 162 passes through an approximate center of the Conrad Meredith node 108. Note however, that nodes may be shown as positioned off-center relative to an orbit path, without departing from the scope of the present teachings.

A swipe gesture 164 along an orbit path, e.g., the first orbit path 112, may cause the Conrad Meredith node 108 and accompanying satellites or planets 144-152 to move along the first orbit path 112 and to result in a reveal of other sibling nodes of the Conrad Meredith node 108, e.g., the Bob Boyle node 106 of FIG. 3.

The first path 112 is said to represent an intermediate path, as it is positioned between different nodes, namely between the Gretchen Adams node 100 and grandchild nodes 144-152 of the Conrad Meredith node 108.

The swipe gesture 164 is said to trigger a reveal of a sibling node that is adjacent to the Conrad Meredith node 108 in the underlying hierarchy represented by the orbit visualization 160. In such a scenario, the Bob Boyle node 106 of FIG. 3 would become the central node and would represent a new navigation location. Such navigation may represent a type of horizontal navigation.

The Gretchen Adams node 100 shown in FIG. 4 represents a higher level reference node, i.e., it provides a visual reference to a higher level in the hierarchy relative to the hierarchical level of the currently navigated-to navigation location, as represented by the central Conrad Meredith node 108.

Note that while the Gretchen Adams node 100 is shown in a lower-left corner of the UI display screen 162, the positioning of the reference node 100 may vary, without departing from the scope of the present teachings. For example, the Gretchen Adams reference node 100 may be positioned in another corner or along a different portion of the periphery of the updated visualization 160. A periphery of a visualization may be any outer portion of a visualization, which may be defined by a position or display region of an outer most node (i.e., furthest from a center, centroid, or centrally displayed node of an orbit visualization).

In the present example embodiment, a two-finger separation gesture applied to a node that lacks siblings or planets (i.e., that represents a bottom-level or bottom tier node) may result in a drill-down software action, resulting in display of a UI display screen showing additional data and/or functionality associated with the node that is selected via application of the two-finger separation gesture applied thereto.

The transition of the first orbit visualization 20 of FIG. 3 to the updated orbit visualization 160 of FIG. 4 may be animated, e.g., to facilitate preservation of context, whereby a user may be more readily able to discern or remember how the updated orbit visualization 160 relates to the initial orbit visualization 20.

The carousel control 134 of FIG. 3 is updated, resulting in an updated carousel control 154. The updated carousel control 154 includes four horizontal bars indicating that the current navigation location represents a fourth navigation step and/or represents a fourth level of the hierarchy represented by the updated orbit visualization 160. Note that the orbiting planets 144-152 correspond to the underlying data objects 64-72 of the bottom tier 78 of the hierarchy 50 represented in FIG. 3.

A pinch gesture 158 may be applied to the Conrad Meredith node 158 to trigger animation of an upward navigation in the associated hierarchy, resulting in transitioning of the updated orbit visualization 160 back to the initial orbit visualization 20 of FIG. 3.

Figure 5:
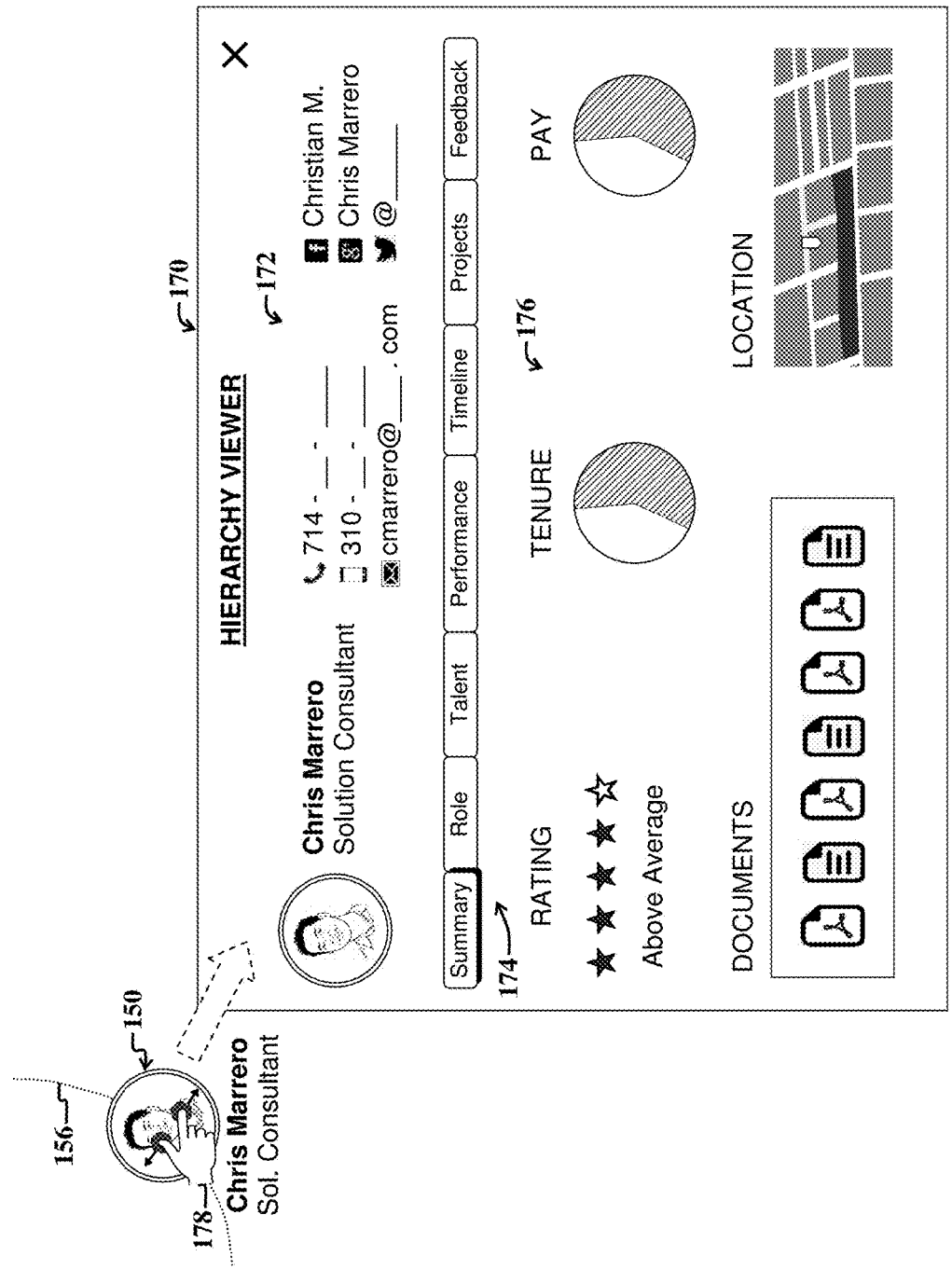
FIG. 5 shows a third example user interface display screen appearing after a drill-down option is selected via a two-finger separation gesture applied to a node of FIG. 4.

FIG. 5 shows a third example user interface display screen 170 appearing after a drill-down option is selected via a two-finger separation gesture 178 applied to the Chris Marrero node 150 of FIG. 4.

The example Chris Marrero node 150 lacks child nodes, as indicated by a lack of associated petals or orbiting planets. Accordingly, while a two-finger separation gesture applied to a node with children results in navigation downward, the two-finger separation gesture 178 applied to a node without children results in a drill-down software action.

For the purposes of the present discussion, a drill-down software action may be any software action that results in retrieval of additional information associated with a feature (e.g., item, node, UI control, etc.) of a UI display screen and/or associated visualization, menu, or other component. In the context of the present discussion, the drill-down action performed on the Chris Marrero node 150 results in result in retrieval of data and functionality (e.g., as presented via one or more UI controls 174) from an underlying computing object associated with an enterprise employee named Chris Marrero. The retrieved data 172, 176 and functionality 174 is presented via the subsequently displayed third UI display screen 170.

In the present example embodiment, the third example UI display screen 170 includes a general information section 172, listing phone numbers, email addresses, and so on, associated with the Chris Marrero node 150. UI controls 174 provide various additional user options to retrieve summary data, role data, talent ratings, performance ratings, employment history timeline information, information about projects that Chris Marrero is working on or has worked on, feedback that Chris Marrero has received from other enterprise personnel, and so on.

Additional information 176, including documents associated with Chris Marrero, office location information, employee rating, and so on, pay, tenure, and so on, is presented graphically. Note that exact details of information and functionality retrieved for a particular drill-down software action are implementation specific and may vary depending upon the needs of a given implementation.

Figure 6:
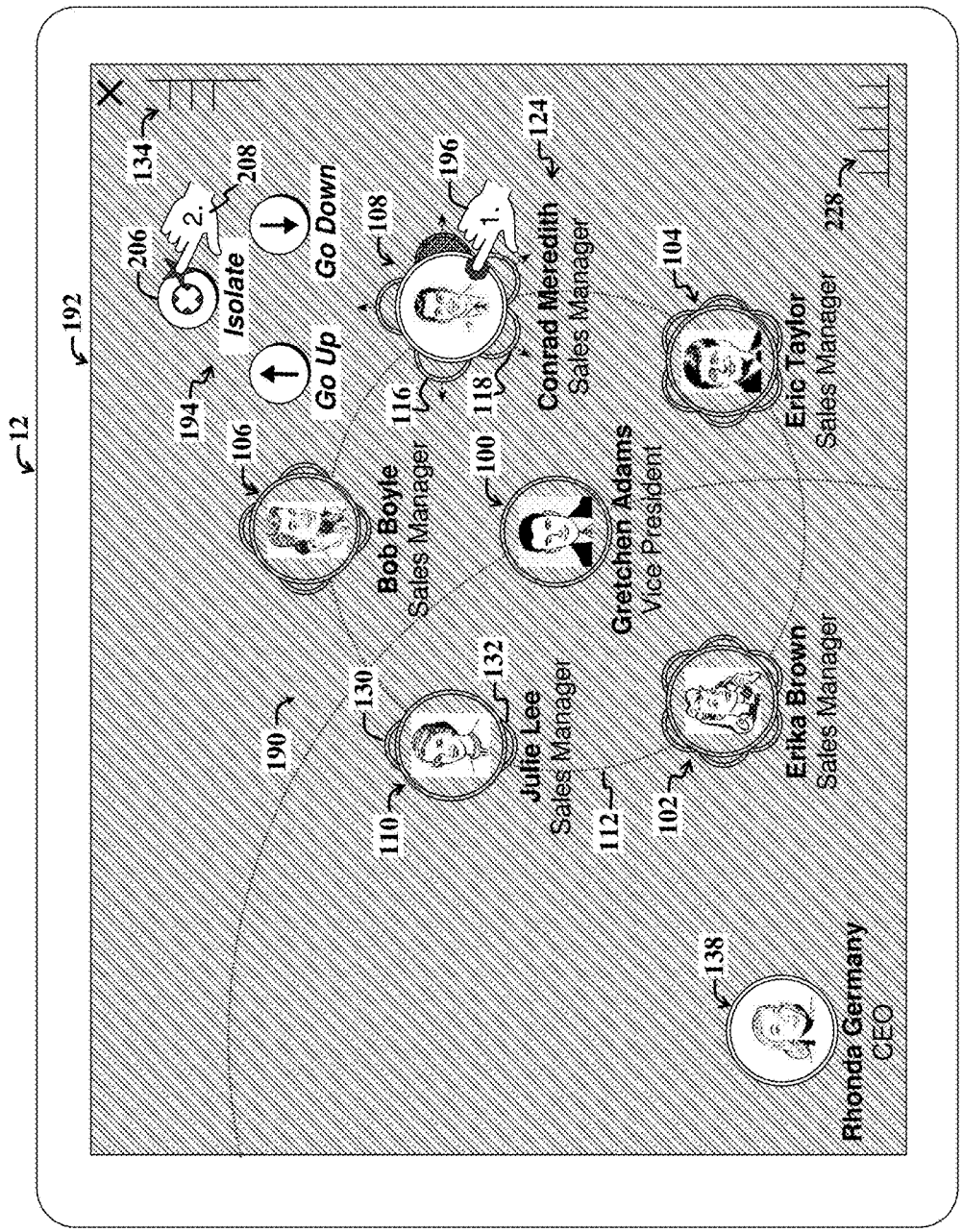
FIG. 6 shows a fourth example user interface display screen illustrating user selection of an isolate option and associated node in combination with initiation of an animation depicting the downward navigation and isolate actions, wherein petals of a selected node are shown expanding from an outer edge of the selected node.

FIG. 6 shows a fourth example UI display screen 192 illustrating user selection of an isolate option 196 from among a collection of controls 194 displayed in association with an orbit visualization 190.

The collection of controls 194 is displayed in response to a tap and hold gesture 196 applied to a selected node 108. The collection of controls 194 includes an isolate option 206, which may be implemented via a button or other UI control, without departing from the scope of the present teachings. The collection of controls 194 optionally includes additional options to navigate the hierarchy (characterizing the orbit visualization 190) upward or downward.

In the present example embodiment, user selection of the isolate option 206 (e.g., via a tap gesture 208 applied to the isolate option 206) triggers initiation of an animation depicting the downward navigation and isolate actions, wherein petals (exemplified by petals 116, 118 of the Conrad Meredith node 108) of the selected node 108 are shown expanding from an outer edge of the selected node 108. Furthermore, a background of the fourth UI display screen 192 is altered to reflect initiation of an animation involved in applying an isolation mode to the selected node 108 and associated orbit visualization 190.

Figure 7:
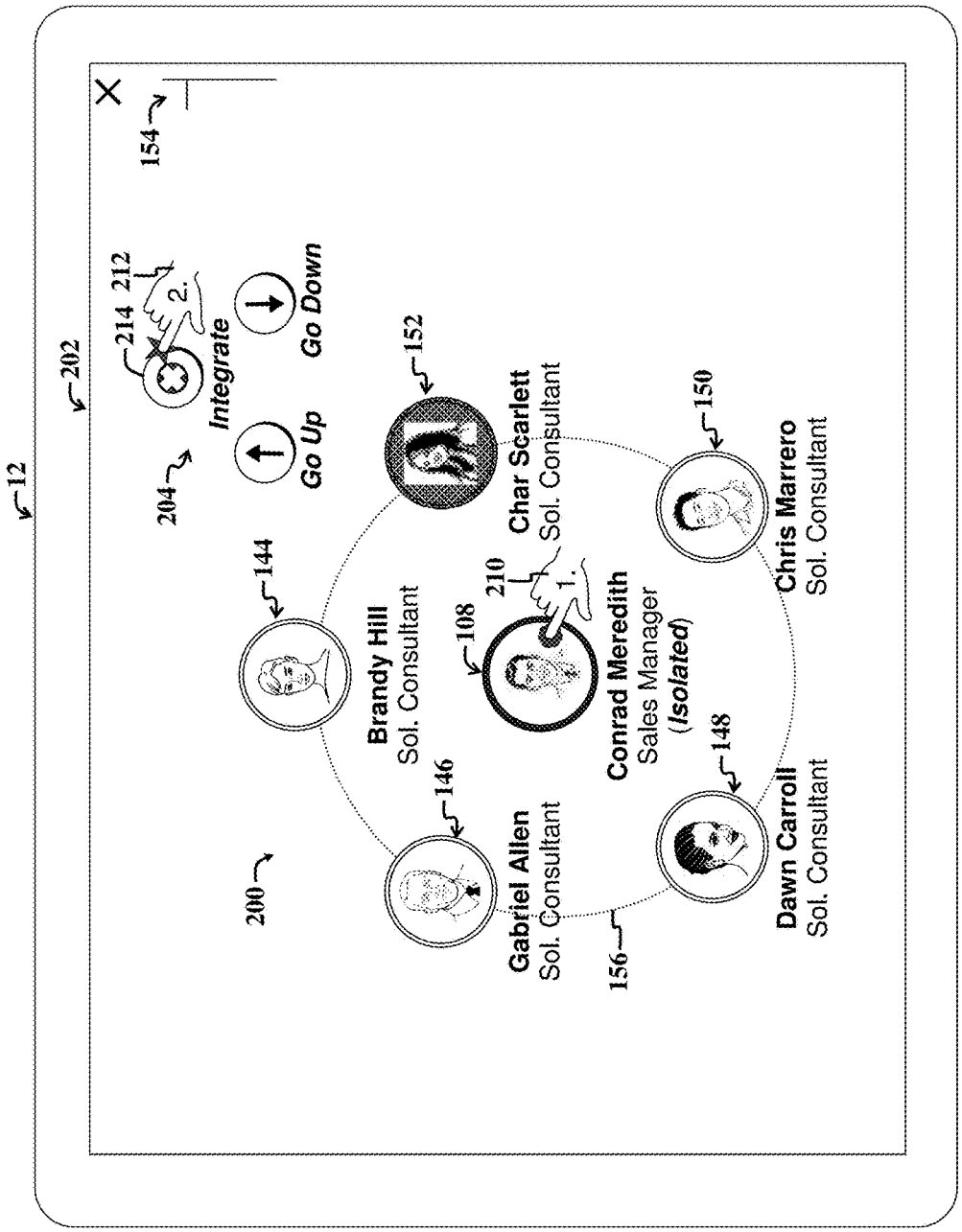
FIG. 7 shows a fifth example user interface display screen illustrating user selection of an integrate option to thereby trigger removal of an isolation state of the displayed visualization and associated isolated node.

When the orbit visualization 190 completes the isolation of the Conrad Meredith node 108, the Conrad Meredith node 108 will become the central node, and higher level nodes will be removed, as shown in FIG. 7.

If the current central Gretchen Adams node 100 is isolated (e.g., via similar steps used to isolate the Conrad Meredith node 108), no navigation is necessary, and the Rhonda Germany node 138 is simply removed from the visualization 190. Similarly, if the Rhonda Germany node 138 is isolated, then the Rhonda Germany node 138 is repositioned as the central node, and an upward navigation action is implemented via an animation. Accordingly, implementation of an isolate action on a node may result in downward, upward, or no navigation in combination with removal of higher level nodes.

FIG. 7 shows a fifth example user interface display screen 202 illustrating user selection of an integrate option 214 (from among a group of controls 204) to thereby trigger removal of an isolation state of a displayed isolated visualization 200 and associated isolated node 108.

In the present example embodiment, the group of controls 204 is activated (i.e., displayed) in response to a tap and hold gesture 210 applied to the currently isolated central Conrad Meredith node 108. User selection of the integrate option 214 may be performed via a tap gesture 212 applied to the integrate option 214.

The group of controls 204 optionally includes additional options to navigate upward or downward in the underlying hierarchy associated with the isolated visualization 200.

Note that an updated vertical carousel control 154 indicates one horizontal bar, indicating that the isolated Conrad Meredith node 108 now represents a top level node after isolation, as during isolation mode, ancestors are removed from the underlying hierarchy. When isolation mode is canceled, the vertical carousel control 154 resets to show four horizontal bars, as ancestors of the Conrad Meredith node 108 are then restored, and the Conrad Meredith node 108 then represents a fourth tier node. Also note that the fifth example UI display screen 202 does not show a horizontal carousel control, as during the present example isolation mode, both ancestor nodes and sibling nodes of the Conrad Meredith node 108 are removed from the underlying hierarchy, until isolation mode is canceled, i.e., the original mode is restored, e.g., by selection of the integration control 214.

Figure 8:
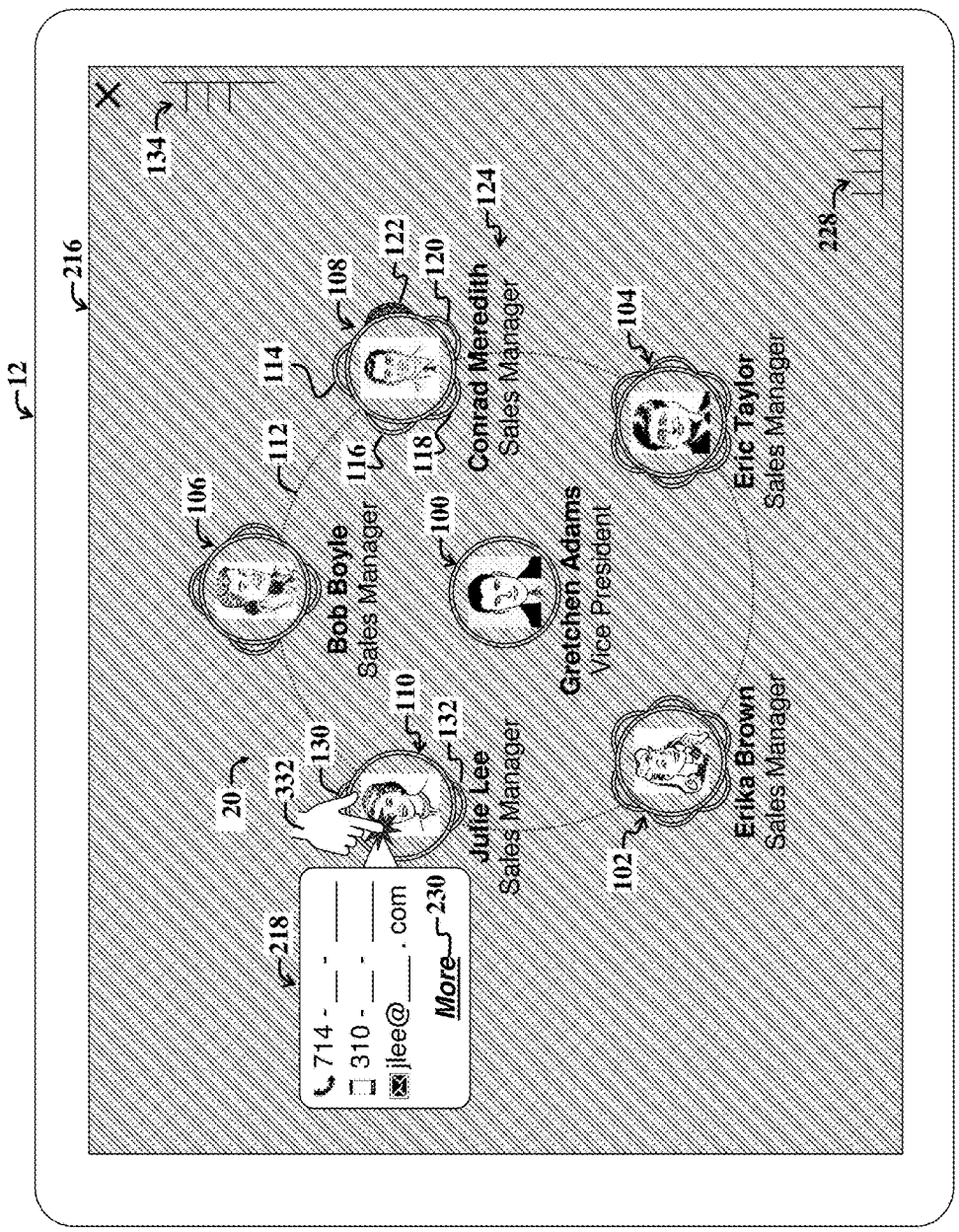
FIG. 8 shows a sixth example user interface display screen illustrating activation of a pop-up menu that shows additional data pertaining to a selected node and one or more user interface controls to implement one or more software actions pertaining to the node.

FIG. 8 shows a sixth example user interface display screen 216 illustrating activation of a pop-up menu 218 that shows additional data (e.g., phone numbers, email, etc.) pertaining to a selected "Julie Lee" node 110 and one or more user interface controls 230 to implement one or more software actions pertaining to the node. For example, user selection of a "more" control 230 may trigger a more complete drill-down action to reveal a UI display screen similar to that shown in FIG. 5, but with details and controls pertaining to the enterprise employee Julie Lee.

The pop-up menu 218 may be activated via a double-tap gesture 332 or other suitable gesture that is not assigned to another set of controls, e.g., other pop-up windows and/or menus, etc.

Note that the vertical carousel control 134 has been adjusted to indicate that the current central Gretchen Adams node 100 is a third tier node representing a third tier object of an underlying hierarchy, e.g., as shown with reference to the Gretchen Adams object 52 of FIG. 2.

Figure 9:
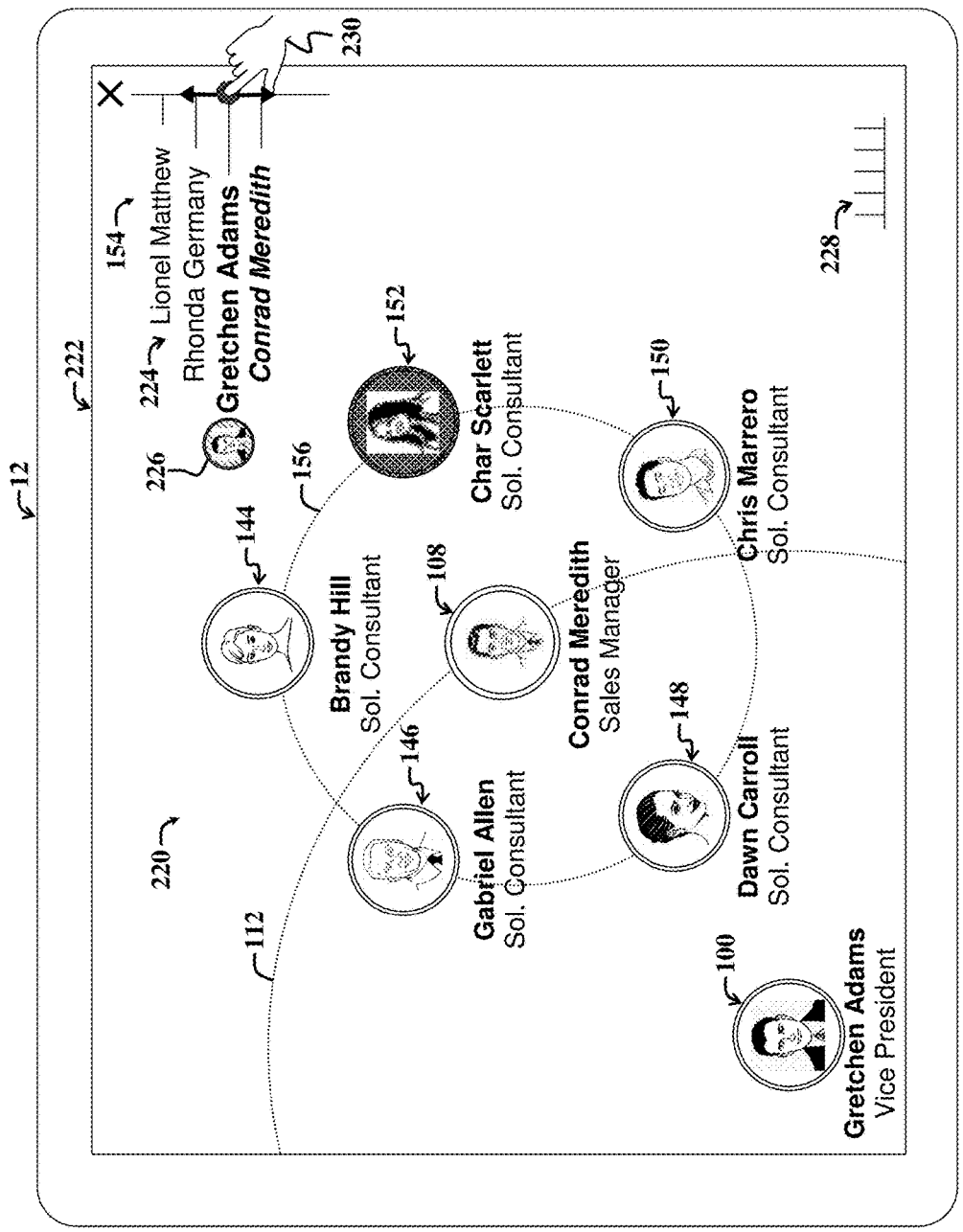
FIG. 9 shows a seventh example user interface display screen illustrating a carousel control, which is adapted to facilitate navigation upward in the hierarchy represented via the displayed visualization.

FIG. 9 shows a seventh example UI display screen 222 and accompanying updated orbit visualization 220. The seventh example UI display screen 222 represents an updated version of the second example UI display screen 202 of FIG. 7 after user activation of a carousel control 154, which provides additional higher level linked references as part of a hierarchically ordered list 224 activated via the vertical carousel control 154.

In the present example embodiment, the user applies a tap, hold, and slide gesture 230 to the vertical carousel control 154 to trigger display of the listing 224 of higher level reference links, which may additionally or alternatively act as linked breadcrumbs. The listed links 224 represent or correspond to nodes that are positioned at or above the current central Conrad Meredith node 108.

As the user moves a finger vertically along the vertical carousel control 154, the location of the finger (as part of the touch gesture 230) determines which item of the linked list 224 is highlighted or otherwise emboldened and visually distinguished from other items (also called linked breadcrumbs or linked higher level references) in the list 224.

In the present example scenario, the user's finger during the tap, hold, and slide gesture 230 is adjacent to a Gretchen Adams item, which is augmented with an icon 226 representative of the Gretchen Adams node (which is a parent node of the Conrad Meredith node 108), which is not shown in the updated visualization 220.

Once the linked list 224 is displayed, the user may release the finger as part of the gesture 230 to select the link corresponding to the finger location when the finger was released. In the present example scenario, release of the gesture 230 at the Gretchen Adams list item 226 results in transition of the orbit visualization 220 back to the orbit visualization 20 of FIG. 3. This represents a type of upward navigation.

Note that the list items 224 represent higher level references that are associated with the same or higher hierarchical levels than the selected Conrad Meredith node 108. Furthermore, note that font sizes of the list items 224 vary in accordance with their distances from the current highlighted item, i.e., the Gretchen Adams item 226. Furthermore, corresponding horizontal bars of the vertical carousel control 154 vary in length in accordance with distance from the currently highlighted list item 226.

Note that while in the present example embodiment, ordered linked list items 224 shown in the vertical carousel control 154 begin with a selected node, e.g., the Conrad Meredith node 108, that embodiments are not limited thereto. For example, one or more other nodes 144-152 may be selected in advance of the tap, hold, and slide gesture 230 to the vertical carousel control 154. Then, items shown in the reference list 224 may adjust to reflect nodes associated with the same and/or higher hierarchical levels or tiers.

The list items 224 may in addition, or alternatively, represent navigation history breadcrumbs, whereby the list items 224 represent historical navigation steps and associated navigation locations previously performed or visited by the user.

Note that the horizontal carousel control 228 may also adapt in accordance with a hierarch level of a selected node to indicate a number of related sibling nodes on the same hierarchical level as the selected node or the central node 108. In this case, the selected Conrad Meredith node 108 is on a hierarchical level with five sibling nodes (not shown), which correspond to the five vertical bars of the horizontal carousel control 228.

The horizontal carousel control 228 may operate similarly to the vertical carousel control 154, with the exception that displayed list items would include reference link items to the various sibling nodes of the Conrad Meredith node 108. If a node is not first selected before activating a carousel control, then the selected node defaults to the central node, e.g., the Conrad Meredith node 108 in the present example embodiment.

Figure 10:
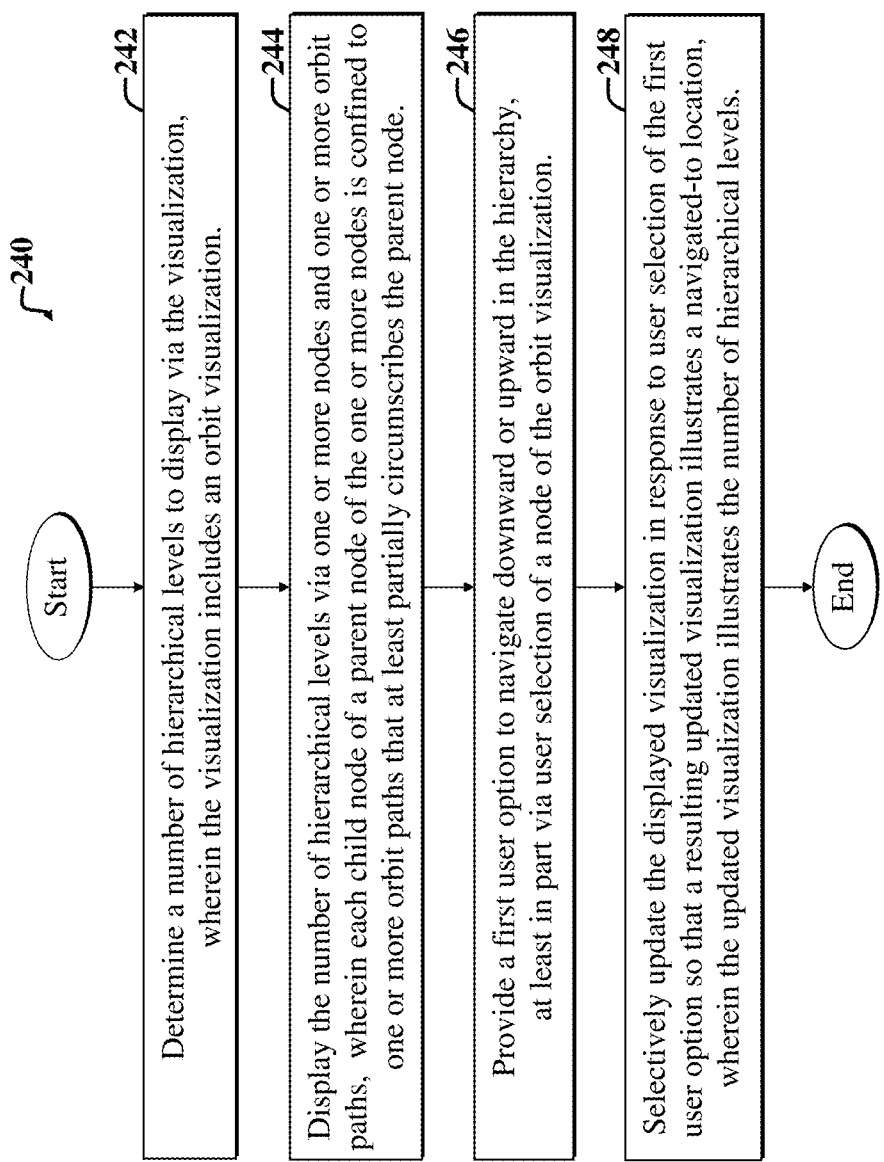
FIG. 10 is a flow diagram of a first example method adapted for use with the embodiments of FIGS. 1-9.

FIG. 10 is a flow diagram of a first example method 240 adapted for use with the embodiments of FIGS. 1-9. The first example method 240 is adapted to facilitate user interaction with data and/or functionality via a visualization, e.g., orbit visualization.

The first example method 240 includes an initial level-determining step 242, which involves determining number of hierarchical levels to display via the visualization.

Next, a displaying step 244 includes displaying the number of hierarchical levels via one or more nodes and one or more orbit paths, wherein each child node of a parent node of the one or more nodes is confined to one or more orbit paths that at least partially circumscribes the parent node.

For the purposes of the present discussion, a hierarchical level is shown in a visualization if a separate node of the level is shown. As the term "separate node" is used herein, a petal that is physically coupled (in the display, whereby the petal abuts or overlaps with the parent node) to a parent node is not a "separate node" from the parent node. Nevertheless, taken in context, in some discussions, a petal may be interpreted as representing an additional hierarchical level. In such interpretations of the word "level," what would otherwise represent a three-level hierarchy (where the bottom level displayed nodes are petals), would actually represent a four-level hierarchy.

A subsequent providing step 246 includes providing a first user option to navigate downward or upward in the hierarchy, at least in part via user selection of a node of the orbit visualization.

Finally, an visualization-updating step 248 includes selectively updating the displayed visualization in response to user selection of the first user option so that a resulting updated visualization illustrates a navigated-to location, wherein the updated visualization illustrates the number of hierarchical levels.

The method 240 may be altered, without departing from the scope of the present teachings. For example, the method 240 may be further augmented to specify that the providing step 246 further includes providing a second user option to navigate downward in a hierarchy represented by the orbit visualization, via a two-finger separation gesture (e.g., the gesture 128 of FIG. 3) applied to a child node (e.g., the node 108 of FIG. 3) of a parent node (e.g., the parent node 100 of FIG. 3) of the visualization (e.g., the visualization 20 of FIG. 3).

The method 240 may further include animating a transition of the orbit visualization from illustrating a first navigation location to illustrating the navigated-to location.

The method 240 may further including displaying an indicator (e.g., the vertical carousel control 134 of FIG. 3) of a hierarchical level associated with the navigated-to location (e.g., the location represented by the central node 100 of a visualization, e.g., the visualization 20 of FIG. 3).

The method 240 may further include providing a third user option to navigate downward in a hierarchy represented via the orbit visualization, via a tap-and-hold gesture; and displaying a navigation menu in response to detection of the tap-and-hold gesture applied to a child node of a parent node, wherein the menu includes a fourth user option to navigate upward and a fifth user option to navigate downward in a hierarchy represented by the orbit visualization.

The method 240 may further include includes providing a sixth user option (e.g., represented via the UI control 206 of FIG. 6) to transition a selected node and accompanying orbit visualization to an isolation mode.

The method 240 may further include transitioning the selected node into an isolation mode, wherein one or more ancestor nodes of the selected node are removed from the displayed orbit visualization, and wherein the selected node becomes a central node of the orbit visualization.

A seventh user option (e.g., as represented via the gesture 178 of FIG. 5) may enable a user to access underlying data associated with a selected node (e.g., the node 150 of FIGS. 4 and 5), wherein the selected node is selected at least in part via user selection of the first user option. The underlying data may include data maintained in a computing object. The seventh user option may represent a user option (e.g., the user option represented by the touch gesture 178 of FIG. 5) to drill down into data (e.g., data 172, 176 of FIG. 5) of the computing object represented via the selected node.

The first example method 240 may further include including displaying a UI display screen (e.g., the UI display screen 170 of FIG. 5) containing additional data not illustrated in the selected node, but associated with the selected node.

The determining step 242 may further include accessing one or more measurements (e.g., a display screen size, resolution, etc.) of one or more display characteristics of a display of a computing device (e.g., the computing device 12 of FIG. 1) used to display the visualization, wherein the computing device includes a mobile computing device.

The first example method 240 may further include providing an eighth user option (e.g., the swipe gesture 164 of FIG. 4) to trigger orbiting or movement of one or more nodes (e.g., the node 108) about a first orbit path that at least partially circumscribes central node what includes one or more orbiting child nodes. A ninth user option may enable a user to trigger orbiting or movement of one or more displayed parent nodes (e.g., the node 108 of FIG. 4) about a second orbit path (e.g., the orbit path 112 of FIG. 4) that at least partially circumscribes a grandparent node (e.g., the node 100 of FIG. 4) of the one or more orbiting child nodes (e.g., the child nodes 14-152 of FIG. 4).

A tenth user option may enable a user option (e.g., a pinch gesture applied to a selected node) to navigate upward in a hierarchy represented via the orbit visualization via a two-finger pinch gesture applied to a node selected via user selection of the ninth user option.

Figure 11:
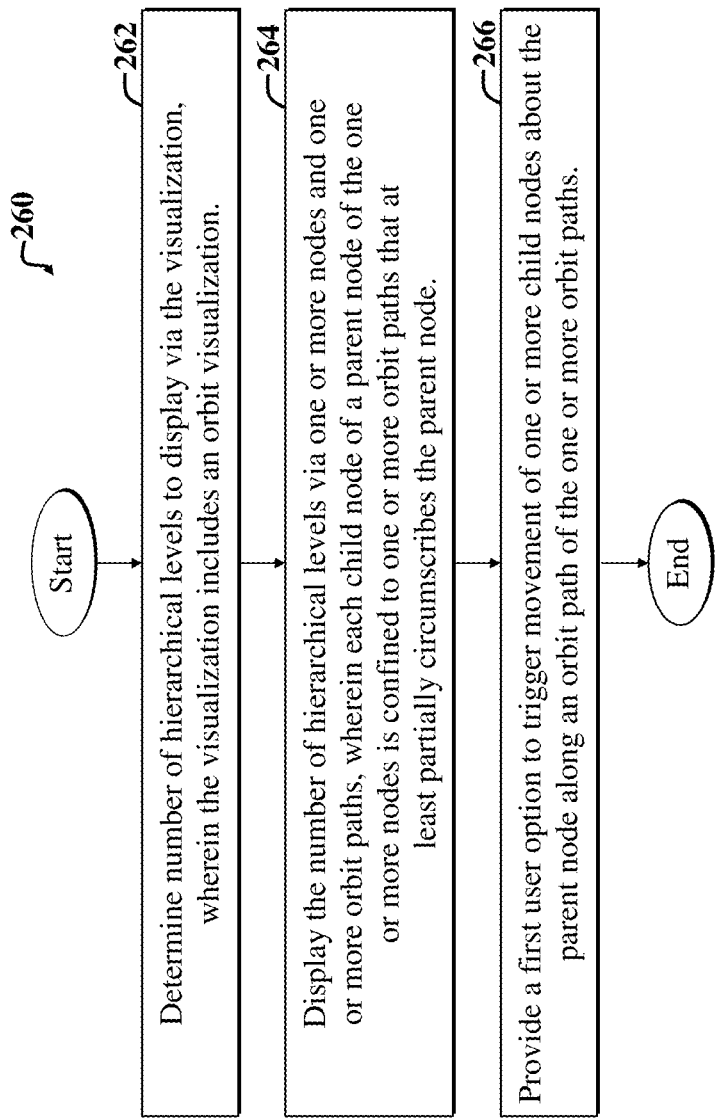
FIG. 11 is a flow diagram of a second example method adapted for use with the embodiments of FIGS. 1-10.

FIG. 11 is a flow diagram of a second example method 260 adapted for use with the embodiments of FIGS. 1-10. The second example method 260 facilitates user interaction with data and/or functionality via an orbit visualization.

The second example method 260 includes a first step 262, which involves determining number of hierarchical levels to display via the orbit visualization.

A second step 264 includes displaying the number of hierarchical levels via one or more nodes and one or more orbit paths. Each child node of a parent node of the one or more nodes is confined to one or more orbit paths that at least partially circumscribes the parent node.

The second example method 260 may be altered, without departing from the scope of the present teachings. For example, the method 260 may further include providing a another user option (e.g., the swipe gesture 164 of FIG. 4) to trigger movement of one or more child nodes (e.g., the node 108 of FIG. 4) about the parent node (e.g., the node 100 of FIG. 4) along an orbit path (e.g., the path 112 of FIG. 4) of the one or more orbit paths (e.g., the paths 112, 156 of FIG. 4).

The second example method 260 may further include providing a user option to navigate upward in a hierarchy represented via the orbit visualization via user selection of a navigation location from a list of navigation breadcrumbs; and employing a carousel control to provide user access to the list in response to user selection of the carousel control.

Figure 12:
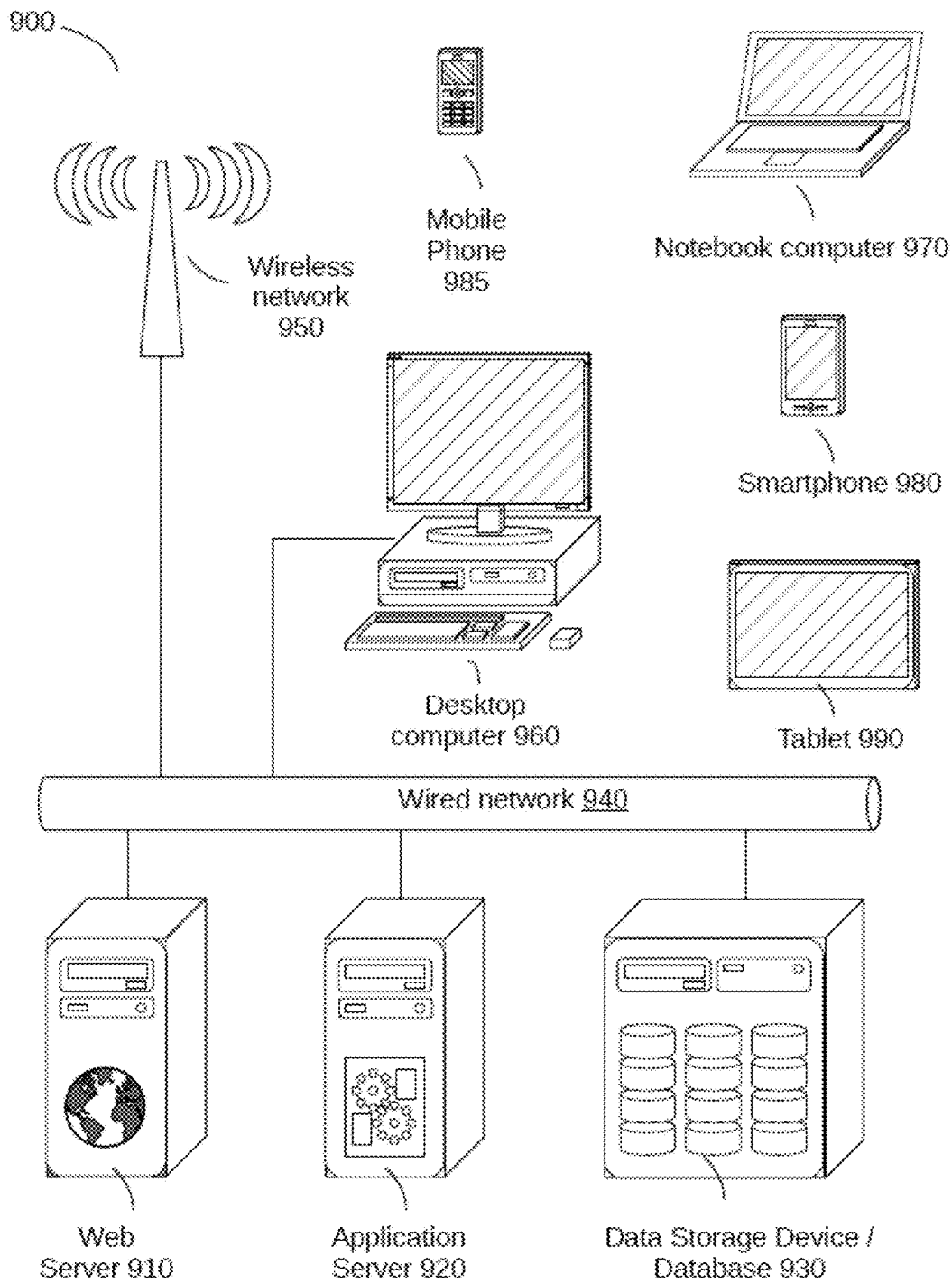
FIG. 12 is a general block diagram of a system for implementing the embodiments of FIGS. 1-11.

FIG. 12 is a general block diagram of a system for implementing the embodiments of FIGS. 1-11.

The example system 900 is capable of generating and displaying orbit visualizations according to embodiments of the invention. Embodiments may be implemented as stand-alone applications (for example, residing in a user device) or as web-based applications implemented using a combination of client-side and server-side code.

The general system 900 includes user devices 960-990, including desktop computers 960, notebook computers 970, smartphones 980, mobile phones 985, and tablets 990. The general system 900 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 900 is shown with five user devices, any number of user devices can be supported.

A web server 910 is used to process requests from web browsers and standalone applications for web pages, electronic documents, enterprise data or other content, and other data from the user computers. The web server 910 may also provide push data or syndicated content, such as RSS feeds, of data related to enterprise operations.

An application server 920 operates one or more applications. The applications can be implemented as one or more scripts or programs written in any programming language, such as Java, C, C++, C#, or any scripting language, such as JavaScript or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can created using HTML (HyperText Markup Language), CSS (Cascading Style Sheets), and other web technology, including templating languages and parsers.

The data applications running on the application server 920 are adapted to process input data and user computer requests and can store or retrieve data from data storage device or database 930. Database 930 stores data created and used by the data applications. In an embodiment, the database 930 includes a relational database that is adapted to store, update, and retrieve data in response to SQL (Structured Query Language) format commands or other database query languages. Other embodiments may use unstructured data storage architectures and NoSQL (Not Only SQL) databases.

In an embodiment, the application server 920 includes one or more general-purpose computers capable of executing programs or scripts. In an embodiment, web server 910 is implemented as an application running on the one or more general-purpose computers. The web server 910 and application server 920 may be combined and executed on the same computers.

An electronic communication network 940-950 enables communication between user computers 960-990, web server 910, application server 920, and database 930. In an embodiment, networks 940-950 may further include any form of electrical or optical communication devices, including wired network 940 and wireless network 950. Networks 940-950 may also incorporate one or more local-area networks, such as an Ethernet network, wide-area networks, such as the Internet; cellular carrier data networks; and virtual networks, such as a virtual private network.

The system is one example for executing applications according to an embodiment of the invention. In another embodiment, application server 910, web server 920, and optionally database 930 can be combined into a single server computer application and system. In a further embodiment, virtualization and virtual machine applications may be used to implement one or more of the application server 910, web server 920, and database 930.

In still further embodiments, all or a portion of the web and application serving functions may be integrated into an application running on each of the user computers. For example, a JavaScript application on the user computer may be used to retrieve or analyze data and display portions of the applications.

Although the description has been described with respect to particular embodiments thereof, these particular embodiments are merely illustrative, and not restrictive. For example, while certain embodiments are discussed herein with respect to use of hierarchical visualizations to display enterprise data via mobile device displays, embodiments are not limited thereto. For example, embodiments may be employed with desktop displays and may be used to illustrate and interact with data other than enterprise-related data, without departing from the scope of the present teachings.

Certain embodiments may respond to changes in user device screen orientation, for instance they may change an orientation of the swim lane or of the panel, or they may change a number of simultaneously displayed tiles.

Certain embodiments may limit parts of a hierarchy viewable for a user based on a user authorization level. And embodiments may limit the information—contained in a data item (should be "shown in association with a node")—that is accessible for reading or writing by a user, based on the user's authorization level.

Certain embodiments may further allow for user interaction in various other ways. Some user input gestures may be tied to functions that intuitively correspond to the gesture, such as scrolling upon receiving a user swipe input in the direction of the visualization orientation. Other user inputs may be tied to functions based on a correspondence in frequency of use, such as using a tap gesture to activate a card and navigate in the hierarchy.

More generally, since any user input could be tied to any orbit visualization function, a user input may be tied to a function based on the need to provide user-friendly interaction capabilities. Since functionality requirements may vary based on the types of hierarchy presented and based on an application in which an orbit visualization may be used, different embodiments may provide different mappings between user inputs and visualization functions.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for facilitating interacting with data or functionality via a visualization in a computing environment, the computing environment including one or more computing devices in communication with a software application, wherein the software application executes software, wherein the software provides displayable information accessible to the one or more computing devices, a computing device of the one or more computing devices executing the steps of the method, the method comprising:
   determining at least four consecutive hierarchical levels to display via the visualization, wherein the visualization includes an orbit visualization;
   displaying a first tier node from the first hierarchical level in a corner of the orbit visualization;
   displaying one or more second tier nodes from the second hierarchical level confined to one or more planetary positions defined by a corresponding second tier orbit path that at least partially circumscribes the first tier node;
   displaying a plurality of third tier nodes, each third tier node positioned in a respective first planetary position defined by a corresponding third tier orbit path, and each third tier node further comprising a respective set of fourth tier nodes below and partially obscured by the third tier node to form individual petals about an outer edge of the third tier node, wherein the individual petals are configured to simulate visual depth to generate an overlapping hierarchy presentation of the set of fourth tier nodes relative to their corresponding third and second tier nodes;
   receiving a two-finger separation touch gesture signal applied to a third tier node;
   in response to receiving the two-finger separation touch gesture applied to the third tier node, selectively updating the visualization so that a resulting updated visualization illustrates a navigated-to location, including:
      replacing the first tier node with the second tier node who is the parent of the selected third tier node,
      displaying the selected third tier node in the former position of its second tier parent node,
      moving the third tier orbit path to the former position of the second tier orbit path, and
      displaying the third tier node's corresponding fourth tier of nodes separated from the third tier node and confined to a fourth tier orbit path;
   receiving a swipe touch gesture along the third tier orbit path;
   in response to receiving the swipe touch gesture along the third tier orbit path:
      rotating the third tier node along the third tier orbit path while simultaneously rotating the third tier node's corresponding fourth tier nodes along the third tier orbit path; and
      rotating a sibling node into the orbit visualization, wherein the sibling node is adjacent to the third tier node in the underlying hierarchy represented by the orbit visualization;
   receiving a tap and hold touch gesture applied to a selected node in the orbit visualization; and
   in response to receiving the tap and hold touch gesture, displaying a collection of controls comprising an isolate control, a control to navigate upward in the hierarchy relative to the selected node, and a control to navigate downward in the hierarchy relative to the selected node;
   receiving a touch gesture applied to the isolate control;
   in response to receiving the touch gesture applied to the isolate control:
      altering the background of the orbit visualization;

triggering an animation comprising petals of the selected node expanding from an outer edge of the selected node;

removing every node that is senior to the selected node from the orbit visualization;

after completing the animation, reverting the background and displaying the selected node at the center of the orbit visualization.

2. The method of claim 1, further including displaying a user interface display screen containing additional data other than additional nodes in the hierarchy, wherein the additional data is not illustrated in the selected node, but wherein the additional data is associated with the selected node.

3. The method of claim 2, wherein determining includes accessing one or more measurements of one or more display characteristics of a display of a computing device used to display the visualization, wherein the computing device includes a mobile computing device.

4. The method of claim 1, further including:

providing a separate user option to navigate upward in the non-overlapping hierarchy presentation represented via the orbit visualization via user selection of a navigation location from a list of navigation breadcrumbs in response to user selection of the carousel control.

5. An apparatus for facilitating interacting with data or functionality via a visualization in a computing environment, the computing environment including one or more computing devices in communication with a software application, wherein the software application executes software, wherein the software provides displayable information accessible to the one or more computing devices, a computing device of the one or more computing devices configured to perform operations comprising:

determining at least four consecutive hierarchical levels to display via the visualization, wherein the visualization includes an orbit visualization;

displaying a first tier node from the first hierarchical level in a corner of the orbit visualization;

displaying one or more second tier nodes from the second hierarchical level confined to one or more planetary positions defined by a corresponding second tier orbit path that at least partially circumscribes the first tier node;

displaying a plurality of third tier nodes, each third tier node positioned in a respective first planetary position defined by a corresponding third tier orbit path, and each third tier node further comprising a respective set of fourth tier nodes below and partially obscured by the third tier node to form individual petals about an outer edge of the third tier node, wherein the individual petals are configured to simulate visual depth to generate an overlapping hierarchy presentation of the set of fourth tier nodes relative to their corresponding third and second tier nodes;

receiving a two-finger separation touch gesture signal applied to a third tier node;

in response to receiving the two-finger separation touch gesture applied to the third tier node, selectively updating the visualization so that a resulting updated visualization illustrates a navigated-to location, including:

replacing the first tier node with the second tier node who is the parent of the selected third tier node, displaying the selected third tier node in the former position of its second tier parent node, moving the third tier orbit path to the former position of the second tier orbit path, and displaying the third tier node's corresponding fourth tier of nodes separated from the third tier node and confined to a fourth tier orbit path;

receiving a swipe touch gesture along the third tier orbit path;

in response to receiving the swipe touch gesture along the third tier orbit path:

rotating the third tier node along the third tier orbit path while simultaneously rotating the third tier node's corresponding fourth tier nodes along the third tier orbit path; and rotating a sibling node into the orbit visualization, wherein the sibling node is adjacent to the third tier node in the underlying hierarchy represented by the orbit visualization;

receiving a tap and hold touch gesture applied to a selected node in the orbit visualization; and in response to receiving the tap and hold touch gesture, displaying a collection of controls comprising an isolate control, a control to navigate upward in the hierarchy relative to the selected node, and a control to navigate downward in the hierarchy relative to the selected node;

receiving a touch gesture applied to the isolate control;

in response to receiving the touch gesture applied to the isolate control:

altering the background of the orbit visualization;

triggering an animation comprising petals of the selected node expanding from an outer edge of the selected node;

removing every node that is senior to the selected node from the orbit visualization;

after completing the animation, reverting the background and displaying the selected node at the center of the orbit visualization.

6. A non-transitory storage medium including instructions executable by one or more computing devices of an enterprise computing environment for facilitating interacting with data or functionality via a visualization in the enterprise computing environment, the enterprise computing environment including a computing device of the one or more computing devices in communication with a software application, wherein the software application executes software, wherein the software application provides displayable information accessible to the one or more computing devices, the non-transitory storage medium including instructions for:

determining at least four consecutive hierarchical levels to display via the visualization, wherein the visualization includes an orbit visualization;

displaying a first tier node from the first hierarchical level in a corner of the orbit visualization;

displaying one or more second tier nodes from the second hierarchical level confined to one or more planetary positions defined by a corresponding second tier orbit path that at least partially circumscribes the first tier node;

displaying a plurality of third tier nodes, each third tier node positioned in a respective first planetary position defined by a corresponding third tier orbit path, and each third tier node further comprising a respective set of fourth tier nodes below and partially obscured by the third tier node to form individual petals about an outer edge of the third tier node, wherein the individual petals are configured to simulate visual depth to generate an overlapping hierarchy presentation of the set of fourth tier nodes relative to their corresponding third and second tier nodes;

receiving a two-finger separation touch gesture signal applied to a third tier node;

in response to receiving the two-finger separation touch gesture applied to the third tier node, selectively updating the visualization so that a resulting updated visualization illustrates a navigated-to location, including:

replacing the first tier node with the second tier node who is the parent of the selected third tier node, displaying the selected third tier node in the former position of its second tier parent node, moving the third tier orbit path to the former position of the second tier orbit path, and displaying the third tier node's corresponding fourth tier of nodes separated from the third tier node and confined to a fourth tier orbit path;

receiving a swipe touch gesture along the third tier orbit path;

in response to receiving the swipe touch gesture along the third tier orbit path:

rotating the third tier node along the third tier orbit path while simultaneously rotating the third tier node's corresponding fourth tier nodes along the third tier orbit path; and rotating a sibling node into the orbit visualization, wherein the sibling node is adjacent to the third tier node in the underlying hierarchy represented by the orbit visualization;

receiving a tap and hold touch gesture applied to a selected node in the orbit visualization; and in response to receiving the tap and hold touch gesture, displaying a collection of controls comprising an isolate control, a control to navigate upward in the hierarchy relative to the selected node, and a control to navigate downward in the hierarchy relative to the selected node;

receiving a touch gesture applied to the isolate control;

in response to receiving the touch gesture applied to the isolate control:

altering the background of the orbit visualization;

triggering an animation comprising petals of the selected node expanding from an outer edge of the selected node;

removing every node that is senior to the selected node from the orbit visualization;

after completing the animation, reverting the background and displaying the selected node at the center of the orbit visualization.

\* \* \* \* \*

UNITED STATES PATENT AND TRADEMARK OFFICE
CERTIFICATE OF CORRECTION

PATENT NO. : 10,175,855 B2
APPLICATION NO. : 14/684171
DATED : January 8, 2019
INVENTOR(S) : Ramanathan et al.

Page 1 of 1

It is certified that error appears in the above-identified patent and that said Letters Patent is hereby corrected as shown below:

In the Specification

In Column 1, Line 47, delete "2013;" and insert -- 2013. --, therefor.

In Column 8, Line 18, delete "UI" and insert -- A UI --, therefor.

Signed and Sealed this
Twenty-fourth Day of March, 2020

Andrei Iancu
*Director of the United States Patent and Trademark Office*